(12) United States Patent
Ishii et al.

(10) Patent No.: US 8,684,840 B2
(45) Date of Patent: Apr. 1, 2014

(54) GAME DEVICE, GAME IMPLEMENTATION METHOD, PROGRAM AND RECORDING MEDIUM

(75) Inventors: Koichi Ishii, Tokyo (JP); Koji Ohkohara, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1614 days.

(21) Appl. No.: 11/870,460

(22) Filed: Oct. 11, 2007

(65) Prior Publication Data

US 2008/0146328 A1    Jun. 19, 2008

(30) Foreign Application Priority Data

Dec. 15, 2006 (JP) ................. 2006-338790

(51) Int. Cl.
*A63F 9/24* (2006.01)
*A63F 13/00* (2006.01)

(52) U.S. Cl.
USPC ................. 463/36; 463/30; 463/31; 463/37

(58) Field of Classification Search
USPC ........................................ 463/30–31, 36–37
See application file for complete search history.

(56) References Cited

U.S. PATENT DOCUMENTS

| | | | |
|---|---|---|---|
| 7,591,721 B2 * | 9/2009 | Matsuno et al. | 463/8 |
| 2003/0092492 A1 | 5/2003 | Ishii et al. | |
| 2004/0119763 A1 * | 6/2004 | Mizobuchi et al. | 345/863 |
| 2004/0224739 A1 * | 11/2004 | Yamada et al. | 463/1 |
| 2005/0176502 A1 * | 8/2005 | Nishimura et al. | 463/31 |
| 2006/0258453 A1 * | 11/2006 | Kando | 463/36 |
| 2007/0202936 A1 | 8/2007 | Ishii | |
| 2007/0225073 A1 | 9/2007 | Ishii | |
| 2008/0170752 A1 * | 7/2008 | Murayama | 382/103 |

FOREIGN PATENT DOCUMENTS

| | | |
|---|---|---|
| JP | 2006-244353 | 9/2006 |
| WO | 2006-095488 | 9/2006 |

OTHER PUBLICATIONS

English language Abstract of JP 2006-244353.
U.S. Appl. No. 11/856,984 to Ishii et al., filed Sep. 18, 2007.

* cited by examiner

*Primary Examiner* — Werner Garner
(74) *Attorney, Agent, or Firm* — Greenblum & Bernstein, P.L.C.

(57) ABSTRACT

In a game which is implemented as a plurality of player characters move on a map, one or more desired player characters, from among the plurality of player characters, are moved toward a desired position on the map by means of an easy operation.

A game is carried out on a game apparatus in which a touch panel is disposed on a front surface of a display device on which a game screen is displayed. All player characters 100 displayed in a range enclosed by means of an operation carried out on the touch panel in such a way as to enclose positions of the player characters 100 displayed on the game screen are set as selected characters. When a pressing operation has been carried out on the touch panel with respect to a position displayed on the game screen, a position on a field corresponding to the position input by means of the operation is set as a destination of the selected characters. In this way, all the player characters for which the destination has been set are moved toward the position of the destination.

19 Claims, 7 Drawing Sheets

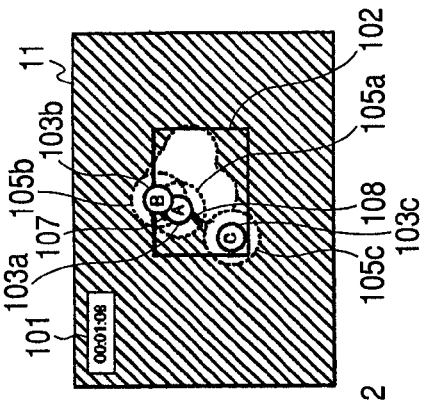
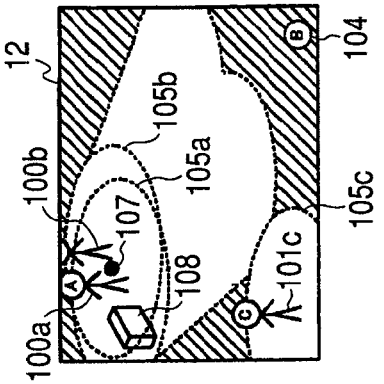
FIG. 3A-1  FIG. 3A-2  FIG. 3A-3  FIG. 3A-4
FIG. 3B-1  FIG. 3B-2  FIG. 3B-3  FIG. 3B-4

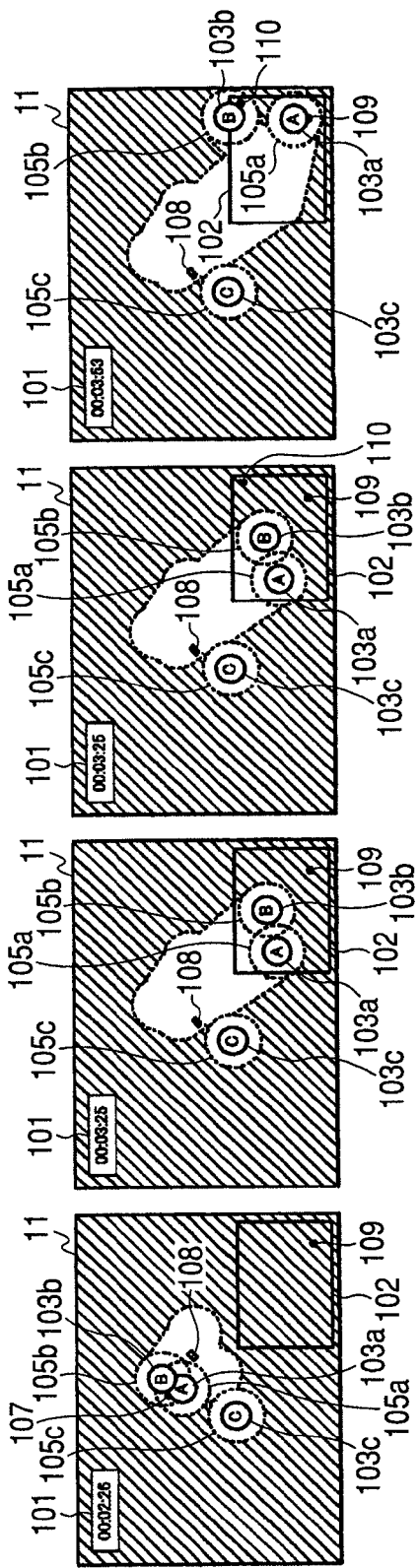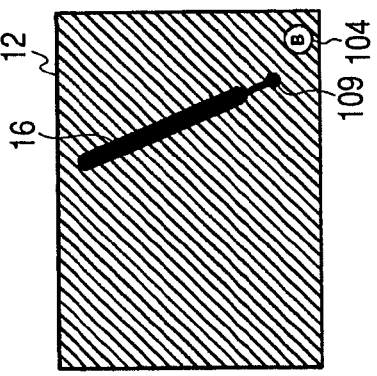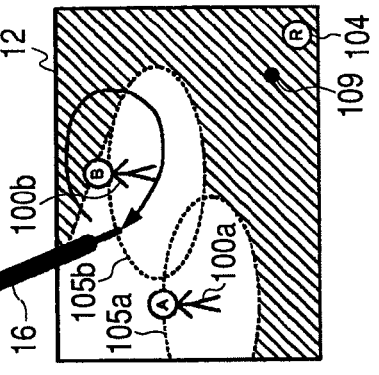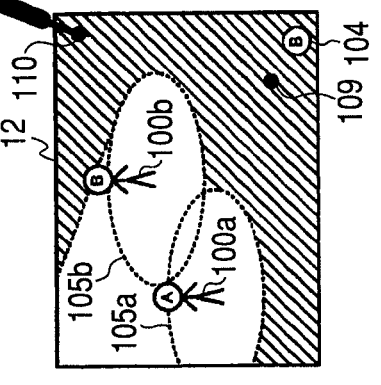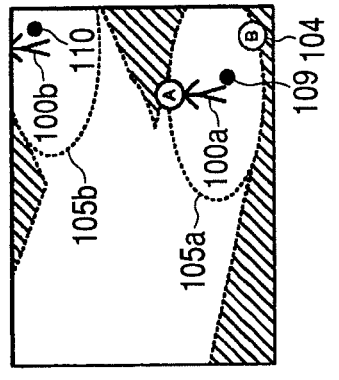

FIG. 5

| NAME | POSITION | DESTINATION |
|------|----------|-------------|
|      |          |             |
|      |          |             |
| ⋮    | ⋮        | ⋮           |
|      |          |             |

GAME DEVICE, GAME IMPLEMENTATION METHOD, PROGRAM AND RECORDING MEDIUM

The present disclosure relates to subject matter contained in Japanese Patent Application No. 2006-338790, filed on Dec. 15, 2006, the disclosure of which is expressly incorporated herein by reference in its entirety.

BACKGROUND OF THE INVENTION

1. Technical Field

The present invention relates to an execution of a game which is implemented as a plurality of player characters move on a map.

2. Related Art

To date, a role playing game (an RPG) or the like has been arranged in such a way that the game is implemented as a player character is moved on a map in accordance with an operation by a player, and an event occurs in accordance with a position to which the player character has moved. Herein, a number of player characters moving on the map in accordance with an operation by one player, not necessarily being limited to one, is plural in some cases.

Herein, in many RPG's, in a case of moving a plurality of the player characters on the map, only one of them is an object to be operated by the player, and the other player characters are moved on the map following a movement of the player character operated. Naturally, by this means, as the plurality of player characters can only act collectively, an excitement involved in causing the plurality of player characters to appear does not increase so much as in the case of causing only one player character to appear in the game.

In response, in the event that it is possible to arrange in such a way that the player characters make different moves on the map, and move independently from one another, an excitement of the game increases. Naturally, in the event that it is arranged that the player must designate destinations on the map, one for each of the player characters, the operation feels cumbersome to the player, for example, in a case in which the destinations of the plurality of player characters do not change, or a like case.

Therefore, a game has been proposed which, being a game in which a plurality of player characters (object images) move on a map, is arranged in such a way that, when a stylus touch position on a touch panel is moved in such a way as to enclose a display position of one or a plurality of optional player characters, from among the player characters displayed on a game screen, the plurality of player characters in a range enclosed with a locus of the movement, while moving toward a stylus touch finish position, form up in a prescribed order (for example, refer to JP-A-2006-244353 (paragraphs 0029 etc.).

However, in the game of JP-A-2006-244353 (paragraphs 0029 etc.), a designation of a player character to be moved, and a designation of a destination, have been carried out by one and the same operation. For this reason, it has been difficult to move the player character, designated to be moved, in a wide range on the map. In the event that the player intends to move a player character, which he or she wants to move, in the wide range on the map, it is sufficient to, after enclosing the player character, which he or she wants to move, by means of a movement operation of a stylus, while maintaining the touching condition, move the stylus to a position which he or she wants to designate as the destination. However, in this case, it being judged that even a player character which the player does not want to move has been designated to be moved, there has been a fear that there occurs a player character which moves on the map despite the player's intentions.

SUMMARY OF THE INVENTION

The invention has an object of providing a game device etc. in which it is possible, in a game which is implemented as a plurality of player characters move on a map, to move one or more desired player characters, from among the plurality of player characters, toward a desired position on the map by means of an easy operation.

In order to achieve the heretofore described object, a game apparatus according to a first aspect of the invention which, including a display for displaying a game screen, and a coordinate position inputter inputting for inputting a coordinate position corresponding to the game screen, executes a game which is implemented as a plurality of player characters moving on a map, the apparatus includes: a map display configured to display at least a portion of the map, the map comprising the plurality of player characters disposed in accordance with their positions on the game screen; an enclosing coordinate inputter configured to cause a plurality of coordinate positions enclosing at least one player characters, from among the plurality of player characters disposed on the displayed portion of the map displayed as the game screen, to be input from the coordinate position inputter by an operation of a player; a position inputter configured to cause a coordinate position corresponding to a desired position on the displayed portion of the map to be input from the coordinate position inputter by the operation of the player after the coordinate positions enclosing the at least one player characters input by the enclosing coordinate inputter; a movement route which determiner configured to determines a movement route for each player character to be taken when the enclosed at least one player character moves toward a position on the map corresponding to the coordinate position input by the position inputter system; and a player character mover configured to cause the enclosed at least one player characters to move on the map in accordance with the movement route for each player character determined by the movement route determiner.

In the game apparatus, the inputting of the coordinate positions is carried out in such a way as to enclose the at least one desired player characters from among the plurality of player characters disposed on the map. The at least one player character enclosed with the input coordinate positions, with movement routes, via which they head toward the desired position on the map input afterward, determined one for each of them, move in accordance with the movement routes. In this way, by means of the operation of inputting the coordinate positions enclosing the at least one player characters, and the operation of inputting the coordinate position of the destination, the player can select desired player characters from among the plurality of player characters disposed on the map, and move all of them toward the desired position on the map by means of one coordinate input operation.

Also, as the operation of inputting the coordinate positions enclosing the at least one player characters, that is, an operation of designating player characters to be moved, and the subsequent operation of inputting the desired coordinate position, that is, an operation of inputting the position toward which the at least more player characters designated to be moved move, are entirely independent operations, the position toward which the at least one player character designated to be moved move is not limited, and also, even in the event that it has been designated to move the player characters designated to be moved toward a position far from their present positions, it is possible to arrange in such a way that there occur no player characters which thereby move on the map despite the player's intentions.

Furthermore, even in the event that two or more player characters are designated to be moved by inputting coordinate positions in such a way as to enclose them, movement routes of the two or more player characters to be moved are determined separately from one another. For this reason, for example, even in the event that coordinate positions are input in such a way as to enclose two or more player characters disposed in positions relatively far apart from one another on the map (in other words, their display positions on the game screen are relatively far apart from one another), it is possible to move all the player characters toward a desired position on the map corresponding to a coordinate position input afterward.

A range which can be displayed on the display device as the game screen may be narrower than a range of the map within which the player characters can move. In this kind of case, it is also acceptable to arrange in such a way that it is possible to, after inputting the coordinate positions enclosing the at least one player characters displayed on the game screen, move the range of the map displayed as the game screen, and then input a coordinate position toward which the at least one player character enclosed with the previously input coordinate positions are to be moved. In this case, it is possible, regardless of the range which can be displayed on the display as the game screen, to move the at least one desired player characters to an optional position on the map.

In the game apparatus according to the first aspect, it is also acceptable that the enclosing coordinate inputter can cause the coordinate positions enclosing the player characters in the process of being moved on the map by the player character mover, in accordance with the movement routes determined by the movement route determiner, to be input from the coordinate position inputter. In this case, it is possible to arrange in such a way that the movement route determiner includes a changed movement route determiner which, in the event that the coordinate positions enclosing the player characters in the process of being moved on the determined movement routes by the movement route determiner have been input by the enclosing coordinate inputter, and furthermore that a coordinate position corresponding to the desired position on the map has been newly input by the desired position inputter, determines new movement routes to be taken when moving the player characters which have been in the process of being moved from their interim positions toward a position on the map corresponding to the coordinate position newly input by the desired position inputter, and it is possible to arrange in such a way that the player character mover moves the player characters, for which the new movement routes have been determined by the changed movement route determiner, on the map in accordance with the newly determined movement routes.

In this case, the player, even when wanting, partway through, to change the destination of the player characters in the process of moving on the map, can move the player characters to a new desired position on the map from their interim positions by repeating the same operation. Also, the operation of newly inputting the coordinate positions enclosing the player characters is an operation independent of the operation of inputting the coordinate position when the player characters currently in the process of moving (it is also acceptable that some have already completed the movements) have first been designated to be moved.

That is, in the event that there are a plurality of the player characters currently in the process of moving, it is possible to move only some of them toward a position on the map corresponding to a newly input coordinate position. For this reason, it is possible to easily carry out, for example, an operation by which the player characters are moved as a whole in a right direction of the screen but, when they have been moved a certain amount in the right direction, some player characters are moved in an upward direction, while some other player characters are moved in a downward direction.

It is also acceptable that the game apparatus according to the first aspect further includes: a stop instruction inputter which, by means of the operation by the player, inputs an instruction to stop the movements on the map of the plurality of player characters; and a player character stopper configured to, in the event that the instruction has been input from the stop instruction inputter, stops all the movements on the map of the plurality of player characters. In this case, it is possible to arrange in such a way that the enclosing coordinate inputter, in a condition in which all the movements on the map of the plurality of player characters are stopped by the player character stopper, causes the coordinate positions enclosing the at least one desired player characters, from among the player characters disposed on the map displayed as the game screen, to be input from the coordinate position inputter.

Herein, it is also acceptable that the game apparatus according to the first aspect further includes: a stop instruction icon display which causes a stop instruction icon for inputting the instruction to stop the movements on the map of the plurality of player characters to be displayed on the display, apart from the game screen or superimposed on the game screen, and it is possible to arrange in such a way that the stop instruction inputter, by causing a coordinate position corresponding to a display position of the stop instruction icon displayed by the stop instruction icon display to be input from the coordinate position inputter, inputs the instruction to stop the movements on the map of the plurality of player characters.

In this way, it is possible, by stopping all the movements on the map of each player character in response to the instruction from the stop instruction inputter, to easily input the coordinate positions in such a way as to enclose the at least one player characters, and designate the player characters to be moved. Furthermore, in the case of inputting the instruction from the stop instruction inputter by inputting the coordinate position corresponding to the stop display icon displayed on the display, the player can also easily carry out the inputting of the instruction to stop the movements on the map of the player characters by means of an operation having a uniformity with the other operation of inputting the coordinate position.

It is also acceptable that the game apparatus according to the first aspect, in a case of including the stop instruction inputter and the player character stopper, further includes: a release instruction inputter which, on the base of the operation by the player, inputs an instruction to release the stopping of the movements on the map of the plurality of player characters by the player character stopper. In this case, it is possible to arrange in such a way that the player character stopper stops all the movements on the map of the plurality of player characters from the instruction being input from the stop instruction inputter until the coordinate position corresponding to the desired position on the map is input by the desired position inputter, or until the instruction is input from the release instruction inputter.

Herein, it is also acceptable that the game apparatus according to the first aspect further includes: a release instruction icon display which causes a release instruction icon for inputting the instruction to release the stopping of the movements on the map of the plurality of player characters to be displayed on the display, apart from the game screen or superimposed on the game screen, and it is possible to arrange in such a way that the release instruction inputter, by causing a coordinate position corresponding to a display position of the release instruction icon displayed by the release instruction icon display to be input from the coordinate position inputter, inputs the instruction to release the stopping of the movements on the map of the plurality of player characters.

In this way, by arranging in such a way that it is possible, even after stopping all the movements of the player characters, to release the stopped condition by inputting the instruction from the release instruction inputter, even in the event that the player has erroneously carried out the operation of inputting the instruction from the stop instruction inputter, or the like, it is possible to restart the movement of each player character from the pre-stopping condition. Also, by arranging in such a way that it is possible to instruct the stopping and releasing of the movements of the player characters, the player being given time to consider whether or not to change an aspect of the movement on the map of each player character after all their movements have once been stopped, it is possible to easily implement the game.

In the game apparatus according to the first aspect, it is possible to arrange in such a way that the map display causes a completed movement range, in a prescribed range of the map from a movement route on which any of the plurality of player characters has been moved by the player character mover, to be displayed in a display aspect differing from that of a range not included in the completed movement range.

In this case, as it is possible to clearly distinguish a range through which any of the player characters has already moved from a different range, the player can easily carry out, for example, an operation of trying to move any of the player characters to a range through which none of the player characters has yet moved.

Herein, it is also acceptable that, apart from the plurality of player characters, at least one game objects having a prescribed effect on an implementation of the game are disposed on the map, and it is possible, in this case, to arrange in such a way that the map display causes only game objects, from among the game objects disposed on the map, disposed in the completed movement range to be displayed on the display in such a way as to be visible on the game screen.

Furthermore, in this case, it is possible to arrange in such a way that the game apparatus further includes: a game object effect activator which causes the prescribed effect set for the game objects, from among the game objects disposed on the map, disposed in the completed movement range to be activated on only the relevant game objects.

In this case, in order for the player to easily find the game objects disposed on the map, it is necessary to expand the completed movement range of at least one of the player character. For this reason, it is possible to prompt the player to operate in such a way as to move at least one of the player character to the range through which none of the characters has yet moved. Also, by arranging in such a way as to cause a prescribed effect (for example, the player acquires it as an item) to be activated on only an object disposed in the completed movement range, it is possible to further prompt the player to operate in such a way as to move at least one of the player character to the range through which none of the characters has yet moved.

It is possible to arrange in such a way that the game apparatus according to the first aspect, in a case of causing the completed movement range and the range not included in the completed movement range to be displayed in different display aspects, further includes: a game starting system which disposes the plurality of player characters in their initial positions on the map, starts the game, and enables the enclosing coordinate inputter to input the coordinate positions enclosing the at least one player character; a game time timer configured to measure a time elapsed after the game has been started by the game starting system; and a game finisher configured to finish the game by stopping the movements on the map of the plurality of player characters by the player character mover when the elapsed time measured by the game time timer has reached a prescribed time.

When the game apparatus arranged to include this kind of game starting system, game time timer or game finisher, a distinct limitation occurs on a time for which each of the plurality of player characters can be moved on the map, that is, a time for which the completed movement range on the map can be expanded. By this means, it is possible to further prompt the player to operate in such a way as to move at least one of the player character to the range through which none of the characters has yet moved.

Even in the event that the game starting system, the game time timer or the game finisher is not included, and there is no distinct time limit on moving the plurality of player characters on the map, a player's psychology works on many players in that they want to turn as wide a range of the map as possible into the completed movement range within the same time, or they want to turn a whole of the map into the completed movement range in as short a time as possible. The player's psychology working as a substantial time limit, and the aforementioned kind of game starter, game time timer or game finisher being included, although not true of all players, for many players, it is not the case that a large difference in the advantage of the invention occurs depending on a difference of whether or not there is the game starter, the game time timer or the game finisher.

In the game apparatus according to the first aspect, it is also acceptable that, apart from the plurality of player characters, at least one non-player characters moving on the map exist on the map. In this case, it is possible to arrange in such a way that the map display includes: an unentered range display system which causes an unentered range in the map, which is not in the prescribed range from either the plurality of player characters or the movement route on which any of the at least one non-player characters has moved, to be displayed in a first display aspect; a player character range display which causes a range, in the prescribed range from the movement route on which any of the plurality of player characters has moved, displayed as the unentered range to be displayed in a second display aspect as a player character range through which the player character has moved previously; and a non-player character range display which causes a range, in the prescribed range from the movement route on which any of the at least one non-player character has moved, displayed as the unentered range to be displayed in a third aspect as a non-player character range through which the non-player character has moved previously.

Herein, it is also acceptable that the non-player characters are characters which are to move on the map in accordance with a program control by a processing device included in the game apparatus. Also, in the event that the game apparatus is communicably connected with another game apparatus having the same configuration, it is also acceptable that the non-player characters are characters which are to move on the map on the base of an operation of the coordinate position inputter by another player who plays the game on the another game apparatus (player characters for the another player).

In this case, it is possible to prompt the player to operate in such a way as to first move his or her own player characters to a range through which none of his or her own characters has yet moved, and no non-player characters have yet moved either. Also, as a match-up between the player characters and the non-player characters (a match-up between the player and a computer or another player) is realized in the game, an excitement occurs in the game.

In the event that, apart from the plurality of player characters and the at least one non-player character, at least one game object having a prescribed effect on a game implementation are disposed on the map, it is possible to arrange in such a way as to cause only a game object, from among the game objects disposed on the map, disposed in the player character range to be displayed on the display in such a way that it is visible on the game screen, and furthermore cause a prescribed advantage set for the game object disposed in the player character range to be activated.

It is possible to arrange in such a way that the game apparatus according to the first aspect further includes: an intersection detector which detects an intersection produced in a coordinate position input path of the enclosing coordinate inputter; and an enclosed range determiner which, in the event that the intersection has been detected by the intersection detector, determines that a closed area formed by the coordinate position input path of the enclosing coordinate inputter, due to the intersection detected on the game screen, is a range enclosed with the coordinate positions input by the enclosing coordinate inputter.

Also, it is also acceptable that the enclosed range determiner, in the event that no intersection has been detected by the intersection detector, determines that a closed area formed by complementing the coordinate position input path of the enclosing coordinate inputter in accordance with a start point and a finish point of the coordinate position input path of the enclosing coordinate inputter is the range enclosed with the coordinate positions input by the enclosing coordinate inputter.

In this way, in the event that the intersection has been detected in the coordinate position input path of the enclosing coordinate inputter, it is possible to determine by an easy process that the closed area of the input path formed by the intersection is the range enclosed by inputting the coordinate positions. Contrarily, even in the event that no intersection has been detected in the coordinate position input path of the enclosing coordinate inputter, as it is sufficient to judge that the closed area formed by complementing the input path is the range enclosed by inputting the coordinate positions, the player need not be required to carry out any meticulous operation in order to designate the player characters to be moved.

In the game apparatus according to the first aspect, it is also acceptable that the display includes a first display and a second display. In this case, it is possible to arrange in such a way that the map display includes a whole map display system which causes a whole of the map to be displayed on the first display as the game screen, and a partial map display system which causes only a part of the map to be movably displayed on the second display as the game screen, and it is possible to arrange in such a way that the coordinate position inputter inputs an optional coordinate position corresponding to the game screen displayed on the second display.

In this case, the player, as well as being able to easily ascertain a whole structure of the map from the game screen displayed on the first display, can look at only a portion of the map with a more detailed display from the game screen displayed on the second display, and ascertain details of a positional relationship between the individual player characters. Then, as the coordinate position inputter is arranged to input the coordinate position corresponding to the game screen displayed on the second display, it is possible to individually designate the player characters to be moved. Also, although only a portion of the map is displayed on the second display as the game screen at one time, as a portion of the map which can be displayed as the game screen on the second display can be moved, it is possible, from this movement, to ascertain the details of the positional relationship between the player characters with respect to the whole of the map.

In the game apparatus according to the first aspect, it is also acceptable that the coordinate position inputter, being configured of a touch panel which, being disposed on a front surface of the display, transmissively shows the game screen displayed on the display, in accordance with a position touched on the touch panel, inputs the optional coordinate position corresponding to the game screen displayed on the display.

Alternatively, it is also acceptable that the coordinate position inputter, being configured of a control pad including a multiaxial acceleration sensor which detects a motion of the coordinate position inputter itself, and a position signal sensor which detects a position signal transmitted from a signal outputter disposed on a periphery of the display, in accordance with a detection result of the multiaxial acceleration sensor and the position signal sensor, points to the game screen displayed on the display and inputs the optional coordinate position corresponding to the game screen displayed on the display.

By inputting the coordinate position by means of this kind of touch operation on the touch panel, or pointing operation using the control pad, both the operation of inputting the coordinate positions enclosing the at least one desired player characters, and the operation of inputting the coordinate position corresponding to the desired position on the map to which the player characters enclosed with the input coordinate positions are to be moved, can be carried out by a player's intuitive input, facilitating the operations.

In order to achieve the heretofore described object, a game implementation method according to a second aspect of the invention which, being executed in a computer including a display for displaying a game screen, a coordinate position inputter for inputting a coordinate position corresponding to the game screen, and a storage which stores information on a game implementation, is for implementing a game which is implemented as a plurality of player characters move on a map, includes: causing a present position on the map of each of the plurality of player characters to be stored in the storage; causing at least a portion of the map on which the plurality of player characters are disposed in accordance with their positions to be displayed as the game screen on the display; causing coordinate positions enclosing at least one desired player character, from among the player characters disposed on the map displayed as the game screen, to be input from the coordinate position inputter by means of an enclosing operation by a player; causing a coordinate position corresponding to a desired position on the map displayed as the game screen to be input from the coordinate position inputter by means of a desired position input operation by the player after the coordinate positions enclosing the at least one player character have been input by the enclosing coordinate inputter; causing a position on the map corresponding to the coordinate position input from the coordinate position inputter by means of the desired position input operation to be stored in the storage as a destination of each player character enclosed with the coordinate positions input from the coordinate position inputter by means of the enclosing operation; and causing the player characters, the destination of which is stored in the storage, to move toward the destination from their present positions stored in the storage in accordance with movement routes determined by a prescribed technique, and the new moved positions to be stored in the storage as the present positions.

In order to achieve the heretofore described object, a computer readable recording medium comprising a program according to a third aspect of the invention executable in a computer that comprises a display that displays a game screen and a coordinate position inputter that inputs coordinate position corresponding to the game screen, the program being executable for implementing a game that comprises a plurality of player characters movable on a map, the computer readable recording medium, comprising: a map display code section which is executable to cause at least a portion of the map on which the plurality of player characters are disposed in accordance with their positions to be displayed as the game screen on the display; an enclosing coordinate input code section which is executable to causes coordinate positions enclosing at least one player character, from among the plurality of player characters disposed on the map, to be input from the coordinate position inputter by an operation of a player; a desired position input code section which is executable to causes a coordinate position corresponding to a desired position on the map to be input from the coordinate position inputter by means of the operation by the player after the coordinate positions enclosing the at least one player characters have been input; a movement route determination code section which is executable to determine a movement route for each player character to be taken when the enclosed at least one player character moves toward a position on the map corresponding to the input coordinate position; and a player character moving code section which is executable to cause the enclosed at least one player characters to move on the map in accordance with the movement route for each player character determined by the movement route determination section.

It is also acceptable that the computer readable recording medium is a recording medium which, being configured in such a way as to be attachable to and removable from the computer, is provided separately from the computer device. It is also acceptable that the computer readable recording medium is a recording medium such as a fixed disk which, being provided in the computer, is provided together with the computer.

BRIEF DESCRIPTION OF THE DRAWINGS

FIGS. 3A-1 to 3A-4 and 3B-1 to 3B-4 show specific examples of images displayed on a first LCD and a second LCD in a simulation RPG according to the embodiment of the invention;

FIGS. 4A-5 to 4A-8 and 4B-5 to 4B-8 show specific examples of images displayed on the first LCD and the second LCD in the simulation RPG according to the embodiment of the invention;

FIG. 5 shows an example of a character management table provided in an RAM of a cartridge in the simulation RPG according to the embodiment of the invention;

FIG. 6 is a flowchart showing a process carried out on a per frame period basis at a normal time in the simulation RPG according to the embodiment of the invention; and FIG. 7 is a flowchart showing a process carried out on the per frame period basis at an image fixing time in the simulation RPG according to the embodiment of the invention.

DESCRIPTION OF THE PREFERRED EMBODIMENT(S)

Hereafter, a description will be given of an embodiment of the invention, with reference to the accompanying drawings.

Figure 1:
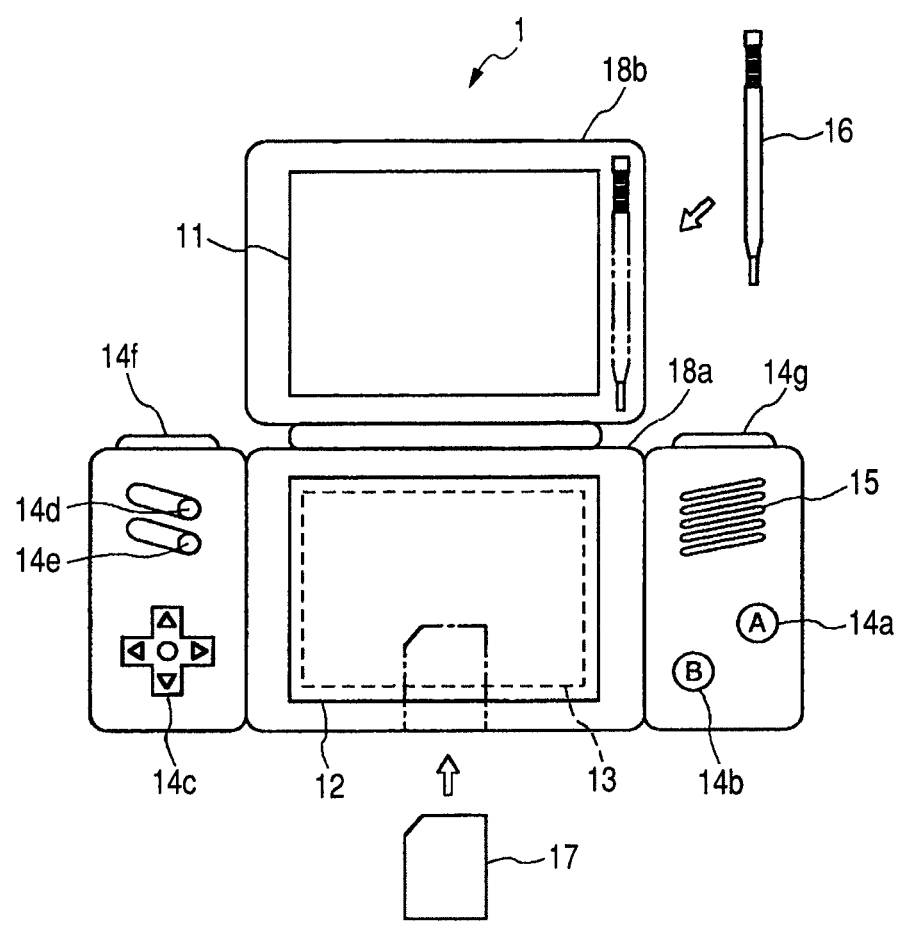
FIG. 1 is an external view showing a configuration of a game apparatus applied to an embodiment of the invention.

FIG. 1 is an external view showing a configuration of a game apparatus 1 applied to the embodiment. Herein, a portable game apparatus is shown as one example of the game device 1. In FIG. 1, the game device 1 is configured by housing two liquid crystal displays (LCD's) 11 and 12 in a housing 18 in such a way that they are in prescribed disposition positions.

In a case of housing the first liquid crystal display (hereafter referred to as "LCD") 11 and the second LCD 12 in such a way as to dispose one on top of the other, the housing 18 being configured of a lower housing 18a and an upper housing 18b, the upper housing 18b is supported in such a way as to be pivotable around a portion of an upper side of the lower housing 18a. In the upper housing 18b, which has a flat form slightly bigger than a flat form of the first LCD 11, an opening is formed in such a way as to expose a display screen of the first LCD 11 through one main surface. In the lower housing 18a, a flat form of which is chosen to be horizontally longer than the upper housing 18b, an opening which exposes a display screen of the second LCD 12 is formed in an approximately central portion of a horizontal direction and, as well as sound outlet apertures of a speaker 15 being formed on one of right and left sides sandwiching the second LCD 12, operating switches 14 are attached to the right and left sides.

The operating switches 14 include an action switch (hereafter referred to as an "A button") 14a, an action switch (hereafter referred to as a "B button") 14b, a directional switch (hereafter referred to as an "arrow key") 14c, a start switch 14d, a selection switch 14e, a side switch (hereafter referred to as an "L button") 14f and a side switch (referred to hereafter an "R button") 14g.

The A button 14a and the B button 14b are attached to one main surface of the lower housing 18a, to a right side of the second LCD 12. The A button 14a and the B button 14b, for example, in a simulation role playing game (hereafter referred to as a "simulation RPG") according to the embodiment, are used to input instructions for behaviors of player objects (in the embodiment, player characters) which can be operated by a player using the operating switches 14.

The arrow key 14c is attached to the one main surface of the lower housing 18a, to a left side of the second LCD 12. The arrow key 14c is used to input a direction on a game screen, such as by instructing a movement direction of a cursor, or instructing a movement direction of a range, to be described hereafter, displayed on the second LCD 12.

The L button 14f and the R button 14g are provided on a left and a right of an upper surface (an upper side surface) of the lower housing 18a. The L button 14f and the R button 14g are used to input a prescribed instruction.

A touch panel 13 (an area delineated by a broken line in FIG. 1) is attached to a top of the second LCD 12. The touch panel 13, which can be any kind among, for example, a resistive type, an optical type (an infrared type) and a capacitive coupling type, when a pressing operation or a movement operation has been carried out on its top surface using a stick 16 (or, as is also possible, a finger), detects and transmits a coordinate position of the stick 16. In the simulation RPG according to the embodiment, the touch panel 13 is used to instruct a selection of buttons displayed on the second LCD 12, instruct a selection of the player characters, or instruct a destination of the player characters.

A storage cavity (an area delineated by a two-dot chain line in FIG. 1) for storing the stick 16, with which the touch panel 13 is operated according to need, is formed in a vicinity of a side surface of the upper housing 18b. The stick 16 is stored in the storage cavity. A cartridge insertion portion (an area delineated by a dashed-dotted line in FIG. 1) for removably attaching a game cartridge (hereafter referred to as a "cartridge") 17 with a built-in memory (for example, an ROM) storing a game program is formed in a portion of a side surface of the lower housing 18a. The cartridge 17 is an information storage medium which stores the game program, and a non-volatile semiconductor memory, such as, for example, an ROM or a flash memory, is used as the cartridge 17. A connector (refer to FIG. 2) for connecting electrically with the cartridge 17 is built into the cartridge insertion portion. Furthermore, an electronic circuit board mounted with each kind of electronic part, such as a CPU, is housed in the lower housing 18a (or, as is also possible, in the upper housing 18b).

Figure 2:
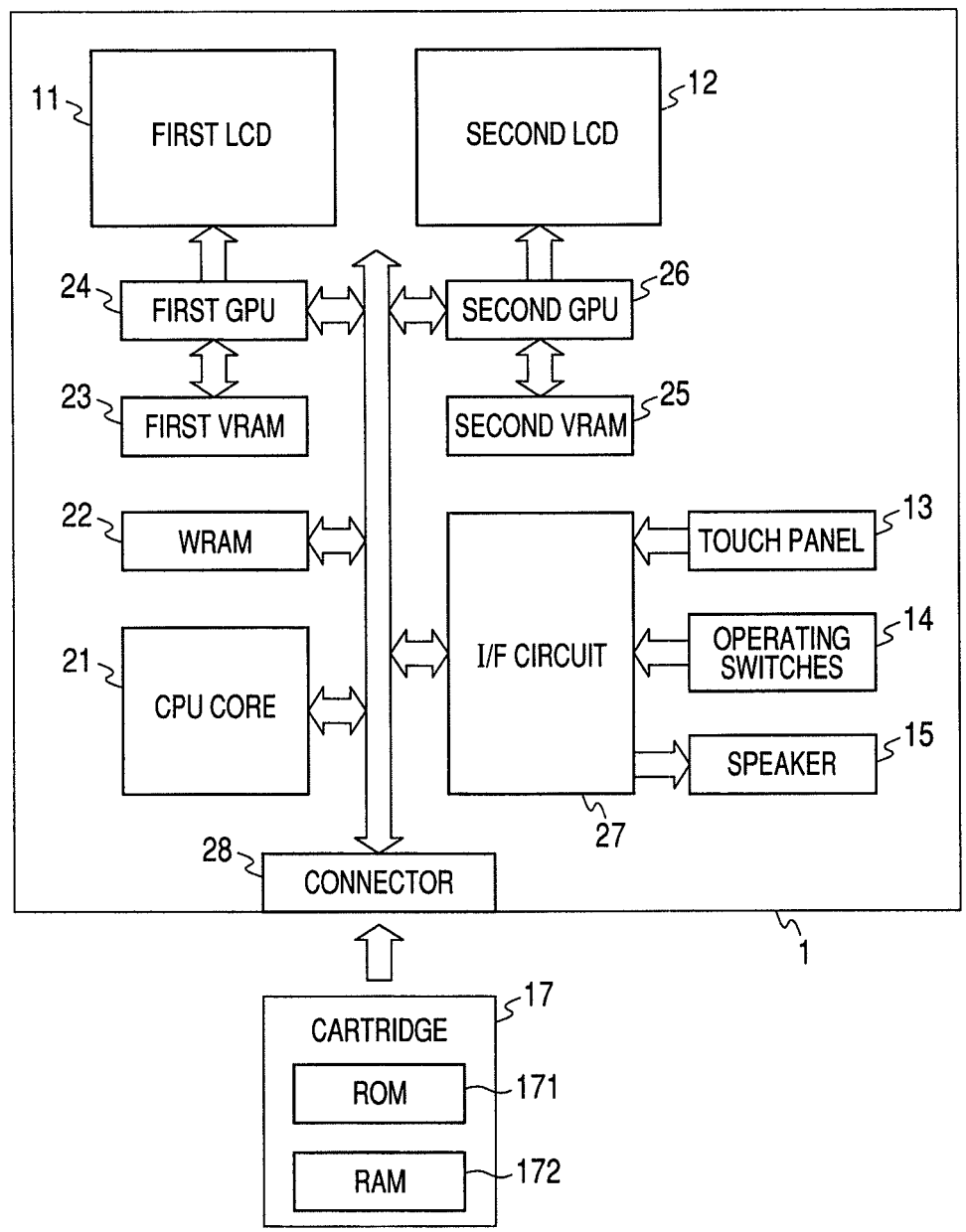
FIG. 2 is a block diagram showing a circuit configuration of the game apparatus applied to the embodiment of the invention.

Next, a description will be given of a circuit configuration of the game apparatus 1. FIG. 2 is a block diagram showing the circuit configuration of the game apparatus 1. In FIG. 2, a CPU core 21 is mounted on the electronic circuit board housed in the housing 18. As well as the connector 28 for connecting with the cartridge 17 being connected, an input/output interface (I/F) circuit 27, a first graphics processing system (a first GPU) 24, a second graphics processing system (a second GPU) 26, and a working RAM (a WRAM) 22 are connected, via a prescribed bus, to the CPU core 21. The CPU 21 includes an internal timer.

The cartridge 17 is removably connected to the connector 28. The cartridge 17, being the storage medium for storing the game program, as described heretofore, specifically, is loaded with an ROM 171 which stores the game program, and an RAM 172, which stores backup data in such a way that they are rewritable. The game program stored in the ROM 171 of the cartridge 17 is loaded into the WRAM 22, and the game program loaded into the WRAM 22 is executed by the CPU core 21. Temporary data obtained by the CPU core 21 executing the game program, and data for generating images are stored in the WRAM 22. The game program including a command group and a data group of a type executable by a computer of the game apparatus 1, particularly, the CPU core 21, is recorded in the ROM 171. Then, this game program is appropriately read into the WRAM 22 and executed.

A first video RAM (hereafter referred to as a "first VRAM") 23 is connected to the first GPU 24, and a second video RAM (hereafter referred to as a "second VRAM") 25 is connected to the second GPU 26. The first GPU 24, in response to an instruction from the CPU core 21, generates a first game image based on the image generating data stored in the WRAM 22, and depicts it on the first VRAM 23. The second GPU 26, in response to an instruction from the CPU core 21, generates a second game image based on the image generating data stored in the WRAM 22, and depicts it on the second VRAM 25. A one-frame time of the image included in the data transmitted from each of the first GPU 24 and the second GPU 26 being, for example, ⅟30 seconds, the first GPU 24 and the second GPU 26 each depict, herein, one image per frame (that is, per ⅟30 seconds).

The first GPU 24 is connected to the first LCD 11, and the second GPU 26 is connected to the second LCD 12. The first GPU 24 transmits the first game image, depicted on the first VRAM 23 in response to the instruction from the CPU core 21, to the first LCD 11. Then, the first LCD 11 displays the first game image transmitted from the first GPU 24. The second GPU 26 transmits the second game image, depicted on the second VRAM 25 in response to the instruction from the CPU core 21, to the second LCD 12. Then, the second LCD 12 displays the second game image transmitted from the second GPU 26.

The touch panel 13, operating switches 14 and speaker 15 are connected to the I/F circuit 27. The I/F circuit 27 is a circuit which carries out a data passing between an external input/output device, such as the touch panel 13, the operating switches 14 or the speaker 15, and the CPU core 21.

The touch panel 13 (including a device driver for use in a touch panel), having a coordinate system corresponding to a coordinate system of the second VRAM 25, transmits coordinate data, which correspond to a position input (instructed) with the stick 16 or the like, to a prescribed register provided in the WRAM 22. For example, a resolution of the display screen of the second LCD 12 is 256 dots by 192 dots, and a detection accuracy of the touch panel 13 is also 256 dots by 192 dots. It is also acceptable that the detection accuracy of the touch panel 13 is either lower or higher than the resolution of the display screen of the second LCD 12. The speaker 15, being disposed in a position inside the heretofore described sound outlet apertures, transmits a sound generated in response to a game being executed.

Hereafter, a description will be given of a game executed by the game apparatus 1 shown in FIGS. 1 and 2 in the embodiment. The game according to the embodiment is the simulation RPG, in which a field is formed in a hypothetical space as a movement space of the player characters, and the player implements the game while moving a plurality of the player characters on the field by means of a touch input from the touch panel 13.

The player, being able to cause the plurality of player characters to participate in the game at the same time, can move the plurality of player characters on the field at the same time. The player is able to select an optional number (one or more) of player characters from among the player characters caused to participate in the game, and move all the selected characters on the field toward a designated destination. The selection of player characters to be moved on the field will be described hereafter in detail.

There being a treasure box, in which an item is put, at a prescribed point on the field, the player can implement the game advantageously by causing a player character to acquire the item from the treasure box. However, the treasure box, when the prescribed point at which is disposed the relevant treasure box is in a searched range, to be described hereafter, is displayed on the display screens of the first LCD 11 and the second LCD 12. The player, by operating the A button 14a in a condition in which the treasure box is positioned in a vicinity of a front of the player character displayed on the display screens of the first LCD 11 and the second LCD 12, can cause the relevant player character to acquire the item from inside the relevant treasure box.

The simulation RPG according to the embodiment being configured of a plurality of stages, a clearing condition is set for each stage. Also, a time limit (for example, 15 minutes) being set up for each stage, a game of a stage is over in the event that the clearing condition set for the relevant stage cannot be met between the player characters being caused to participate in the game of the stage, and the time limit elapsing.

Next, a specific description will be given, while referring to examples of images displayed on the first LCD 11 and the second LCD 12, of a flow, in the simulation RPG according to the embodiment, from player characters to be moved on the field being selected until all the selected player characters are moved on the field.

FIGS. 3A-1 to 3A-4 and 4A-5 to 4A-8 show specific examples of the image displayed on the first LCD 11. FIGS. 3B-1 to 3B-4 and 4B-5 to 4B-8 show specific examples of the image displayed on the second LCD 12. FIGS. 3A-1 and 3B-1, FIGS. 3A-2 and 3B-2, FIGS. 3A-3 and 3B-3, FIGS. 3A-4 and 3B-4, FIGS. 4A-5 and 4B-5, FIGS. 4A-6 and 4B-6, FIGS. 4A-7 and 4B-7, and FIGS. 4A-8 and 4B-8 are in a relationship in which each set is displayed on the first LCD 11 and the second LCD 12, respectively, at the same time.

The images displayed on the first LCD 11 and the second LCD 12 at a stage start time are shown in FIGS. 3A-1 and 3B-1, respectively. In FIGS. 3A-1 and 3B-1, a player character 100a, a player character 100b and a player character 100c, participating in the game, are each disposed in a prescribed position (a position logged off last time or an initial position) on the field.

As shown in FIG. 3A-1, a map screen, a timer 101 and a visible range frame 102 are included in the image displayed on the first LCD 11. The map screen displays a map of a whole of the field formed in the hypothetical space in relation to a stage being executed. Positions on the field of the player characters 100a to 100c are indicated on the map screen by marks 103a to 103c (white circles) set for the relevant player characters 100a to 100c, respectively.

The timer 101 starts a timing by means of the internal timer of the CPU core 21 when the player characters 100 have been disposed on the field (at the stage start time), and displays a time being measured thereby (however, it may be stated in the following description that the timer 101 measures the time). The game is over in the event that the clearing condition set for each stage cannot be met before the timer 101 times 15 minutes. The visible range frame 102 indicates a range on the field of the hypothetical space displayed on the game screen of the second LCD 12. The visible range frame 102, constantly having a certain size, is narrower than the range displayed on the map screen.

As shown in FIG. 3B-1, the game screen and a switching button 104 are included in the image displayed on the second LCD 12. The game screen displays a range in the visible range frame 102 on the field of the hypothetical space. The range displayed on the game screen (the range in the visible range frame 102, hereafter referred to as a "visible range") moves in response to an input from the arrow key 14c. When the visible range has moved in response to the input from the arrow key 14c, along with the movement of the visible range, the visible range frame 102 also moves on the map screen. The switching button 104, being blue (designated by B in the figure) at a normal time, is red (designated by R in the figure) at an image fixing time to be described hereafter.

Character-by-character search ranges 105a to 105c, each of which has a circular shape of a prescribed radius centered around the position on the field of each player character 100a to 100c participating in the game, are set one for each player character 100a to 100c. The character-by-character search ranges 105 move along with movements of the corresponding player characters 100. In FIGS. 3A-1 and 3B-1, the character-by-character search ranges 105a to 105c set one for each player character 100a to 100c are indicated by a dotted circle.

In the hypothetical space, a range included in the character-by-character search ranges 105 being high in brightness, the player can visually perceive an image in the range high in brightness on the map screen and the game screen. A range, once it is included in the character-by-character search ranges 105 and becomes high in brightness, will never be lower in brightness afterward.

In the hypothetical space, a range which has not yet been included in the character-by-character search ranges 105 being low in brightness, the player cannot visually perceive an image in the range low in brightness on the map screen and the game screen. In FIGS. 3A-1 and 3B-1, the ranges low in brightness are indicated by oblique lines. Hereafter, the range which has become high in brightness due to the movement of any player character 100 will be referred to as the searched range, and the range which remains low in brightness due to there still being no movement of any player character 100 will be referred to as an unsearched range.

In FIGS. 3A-1 and 3B-1 in which the player characters 100 have not yet moved, the searched range 106 is only a range included in one of the character-by-character search ranges 105a, 105b and 105c. In FIGS. 3A-1 and 3B-1, the character-by-character search ranges 105 and the searched range 106 are displayed by dotted lines in order to show them in an understandable way, but it is also acceptable that they are not displayed on the map screen or the game screen.

As shown in FIG. 3B-1, the switching button 104 is displayed in blue at the normal time. When a position on the touch panel 13 corresponding to a position of the blue switching button 104 displayed on the second LCD 12 has been touched by means of the pressing operation, the images displayed on the first LCD 11 and the second LCD 12 are fixed as images being displayed at the present moment on the first LCD 11 and the second LCD 12, and the movements of the player characters 100 stop. When the images have been fixed, the switching button 104 displayed on the second LCD 12 turns red, and the timing of the timer 101 stops.

In a condition in which the images are fixed, when the touch panel 13 has been touched continuously by means of the movement operation which moves circularly in such a way as to enclose positions thereon corresponding to the positions of the player characters 100 displayed on the game screen of the second LCD 12, all the player characters 100 enclosed are set as player characters 100 for which it is possible to set a destination on the field (hereafter referred to as "selected characters"). Hereafter, an operation of setting the selected characters by the touch panel 13 being touched by circling will be referred to as an enclosing operation. The player can set a plurality of the player characters 100 as the selected characters at the same time by means of the enclosing operation.

FIGS. 3A-2 and 3B-2 respectively show images displayed on the first LCD 11 and the second LCD 12 when the enclosing operation is being carried out in the condition in which the images are fixed. In FIG. 3B-2, a locus input by means of the enclosing operation is displayed by an arrow in order to show it in an understandable way, but is not shown on the game screen.

When the enclosing operation has been carried out, first, an enclosed range is determined. In the event that there is an intersection in a locus, from a start point to a finish point, input by means of the enclosing operation, an area closed by the intersection is the enclosed range. In the event that, as shown in FIG. 3B-2, there is no intersection in the locus, from the start point to the finish point, input by means of the enclosing operation, a closed area (in a case of a plurality of the closed areas, a whole thereof) formed by the locus and a line drawn from the start point to the finish point is the enclosed range. However, in the event that no closed area is formed by the locus and the line drawn from the start point to the finish point (for example, the locus, from the start point to the finish point, input by means of the enclosing operation is a straight line), no selected character is set.

In FIG. 3B-2, the player character 100a and the player character 100b, being displayed positioned in the enclosed range input by means of the enclosing operation, are set as the selected characters. In the event that there is no player character 100 displayed positioned in the enclosed range input by means of the enclosing operation, no selected character is set.

In a case in which the selected characters are set, when the position on the touch panel 13 corresponding to the position on the field displayed on the game screen of the second LCD 12 has been touched by means of the pressing operation, the position on the field corresponding to the touched position on the touch panel 13 is set as the destination of the player characters 100 set as the selected characters. Hereafter, an operation of setting the destination of the selected characters will be referred to as a destination designating operation.

FIGS. 3A-3 and 3B-3 respectively show images displayed on the first LCD 11 and the second LCD 12 when, in the condition in which the selected character is set, the destination designating operation is being carried out with respect to a position 107 on the field displayed on the game screen of the second LCD 12. In FIGS. 3A-3 and 3B-3, the position input by means of the destination designating operation is shown by a black circle in order to show it in an understandable way, but is not displayed on the game screen.

In FIGS. 3A-3 and 3B-3, in which the destination designating operation is being carried out with respect to the position 107 on the field displayed on the game screen of the second LCD 12 in a condition in which the player characters 100a and 100b are set as the selected characters, the position on the field corresponding to the position 107 is set as the destination of the player characters 100a and 100b. When the destination of the player characters 100 has been set, the condition in which the images are fixed is released, and the stopping of the movements of the player characters 100 is released. Once the condition in which the images are fixed is released, the switching button 104 displayed on the second LCD 12 turns blue, and the stopped timing of the timer 101 is restarted.

Hereafter, a time, for which the images are fixed by the position on the touch panel 13 corresponding to the position of the switching button 104 displayed on the game screen of the second LCD 12 being touched by means of the pressing operation, and the switching button 104 is displayed in red, will be referred to as the "image fixing time", as distinct from the "normal time" for which the switching button 104 is displayed in blue.

The images are fixed by the position on the touch panel 13 corresponding to the position of the switching button 104 (blue) being touched at the normal time by means of the pressing operation, but the fixing of the images is released by the position on the touch panel 13 corresponding to the position of the switching button 104 (red) being touched once more by means of the pressing operation. The image fixing is also released in the same way in the event that the destination designating operation has been carried out while the selected characters remain set. The player, by touching the position on the touch panel 13 corresponding to the position of the switching button 104 displayed on the game screen of the second LCD 12 by means of the pressing operation, can switch a game condition between the normal time and the image fixing time. Hereafter, an operation of switching the game condition between the normal time and the image fixing time will be referred to as a switching operation.

When the image fixing has been released, next positions via which the player characters 100a and 100b head toward a destination position (a position on the field corresponding to the position 107) from their current positions are determined, one for each of them, on a per frame period basis. Then, the player characters 100a and 100b are each automatically moved on the field at a certain speed toward the destination through the determined position.

FIGS. 3A-4 and 3B-4 respectively show images displayed on the first LCD 11 and the second LCD 12 when the player characters 100a and 100b have arrived at the destination (the position on the field corresponding to the position 107). In FIGS. 3A-4 and 3B-4, the searched range 106 has a range included in one of the character-by-character search ranges 105a, 105b and 105c, and a range which has been in the character-by-character search ranges 105a and 105b on a route on which the player characters 100a and 100b have moved. As shown in FIGS. 3A-4 and 3B-4, the searched range 106 expands along with the movement of the player characters 100a and 100b to the unsearched range.

In FIGS. 3A-4 and 3B-4, the treasure box 108 on the field included in the searched range 106 is also displayed. By expanding the searched range 106, the player, being able to expand a range in which the map displayed on the map screen can been seen, can cause the player characters 100 to acquire the item from inside the treasure box 108 at the prescribed point on the field displayed on the game screen.

When the player characters 100 have arrived at the set destination, they stop their movements on the field. In order to move the player characters 100 anew on the field of the hypothetical space, selected characters are set again by means of the enclosing operation, and a destination is designated by means of the destination designating operation.

The player, by operating the arrow key 14c, can move the visible range (the range in the visible range frame 102) in a direction of the operation. FIGS. 4A-5 and 4B-5 respectively show images which are displayed on the first LCD 11 and the second LCD 12 when the enclosing operation is carried out anew, the visible range is moved in response to the operation of the arrow key 14c in a condition in which the player characters 100a and 100b are set as the selected characters, and the destination designating operation is being carried out with respect to the position 109 on the field displayed on the game screen of the second LCD 12.

Figure 5:
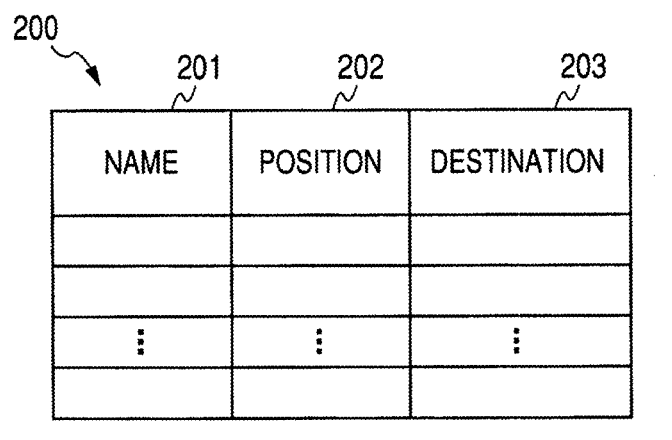

On the map screen of FIG. 4A-5, all the range included in the visible range frame 102 is the unsearched range shown by oblique lines. Herein, an image in a portion (the range in the visible range frame 102) on the field of the hypothetical space displayed on the game screen of FIG. 4B-5 being low in brightness, the player cannot visually perceive the relevant image.

In FIGS. 4A-5 and 4B-5 in which the destination designating operation is being carried out with respect to the position 109 on the field displayed on the game screen of the second LCD 12 in the condition in which the player characters 100a and 100b are set as the selected characters, a position on the field corresponding to the position 109 is set as the destination of the player characters 100a and 100b. When the destination of the player characters 100 has been set, in the same way as in FIGS. 4A-3 and 4B-4, next positions via which the player characters 100 head toward the destination position (the position on the field corresponding to the position 109) are determined, one for each of them, on the per frame period basis, and the player characters 100a and 100b are each automatically moved on the field at the certain speed toward the destination through the determined position.

Even when the player characters 100a and 100b are in the process of moving until they arrive at the destination (the position on the field corresponding to the position 109), it is possible to carry out a new enclosing operation in a condition in which the images are fixed by means of the switching operation. FIGS. 4A-6 and 4B-6 respectively show images displayed on the first LCD 11 and the second LCD 12 at this time.

In FIGS. 4B-6, the player character 100b, being displayed positioned in an enclosed range input by means of the enclosing operation, is set as the selected character. FIGS. 4A-7 and 4B-7 respectively show images which are displayed on the first LCD 11 and the second LCD 12 when, in a condition in which the player character 100b is set as the selected character, the destination designating operation is being carried out with respect to a position 110 on the field displayed on the game screen of the second LCD 12.

In FIGS. 4A-7 and 4B-7, a position on the field corresponding to the position 110 is set as a new destination of the player character 100b. Then, in the same way as in FIGS. 4A-3 and 4B-3, a next position via which the player character 100b heads toward a destination position (the position on the field corresponding to the position 110) is determined for the player character 100b on the per frame period basis, and the player character 100b is automatically moved on the field at the certain speed, not toward the previously set destination (the position on the field corresponding to the position 109), but toward a destination (the position on the field corresponding to the position 110) through the determined position.

FIGS. 4A-8 and 4B-8 respectively show images which are displayed on the first LCD 11 and the second LCD 12 when the player character 100a has arrived at the destination (the position on the field corresponding to the position 109), and the player character 100b set as the selected character has arrived at the destination (the position on the field corresponding to the position 110).

Next, a description will be given of data being managed by the RAM 172 of the cartridge 17 in the simulation RPG according to the embodiment. FIG. 5 shows a character management table which manages the player characters 100. As shown in FIG. 5, a name 201, a position 202 and a destination 203 are registered for each player character 100 in the character management table 200.

The name 201 is a name which each player character 100 uses in a game world. The position 202 is shown by coordinates at which a current position of each player character 100 on the field is set in a game space.

The destination 203 is shown by coordinates at which the position on the field set as the destination of each relevant player character 100 by means of the destination designating operation is set in the game space. A player character 100 whose destination 203 is not registered does not move on the field. Data of the destination 203 of a player character 100, a new destination of which has been designated, are thereby updated. In the event that the player character 100 has arrived at a position registered as the destination 203, the data of the relevant destination 203 are deleted.

Hereafter, a description will be given of processes to be executed in the simulation RPG according to the embodiment in order to execute the game on the game apparatus 1 shown in FIGS. 1 and 2. A process for generating images corresponding to an implementation of the game on the per frame period basis, and displaying the images on the first LCD 11 and the second LCD 12, is carried out by the CPU core 21, the first GPU 24 and the second GPU 26, but a detailed description is omitted as the process has hitherto remained unchanged. In the following description, described as the process of displaying the images on the first LCD 11 and the second LCD 12 is a process of including them in the images generated on the per frame period basis. As regards processes other than a process specific to the embodiment, a description is omitted in some cases other than the above case. Also, information in the process of being processed by the CPU core 21 (including information indicating details to be displayed) is temporarily stored in the WRAM 22.

In the following, it is taken that player characters 100 selected by the player are already disposed on a field of a stage selected by the player, and that the timing of the timer 101 is started, and the color of the switching button 104 is set to be blue.

Figure 6:
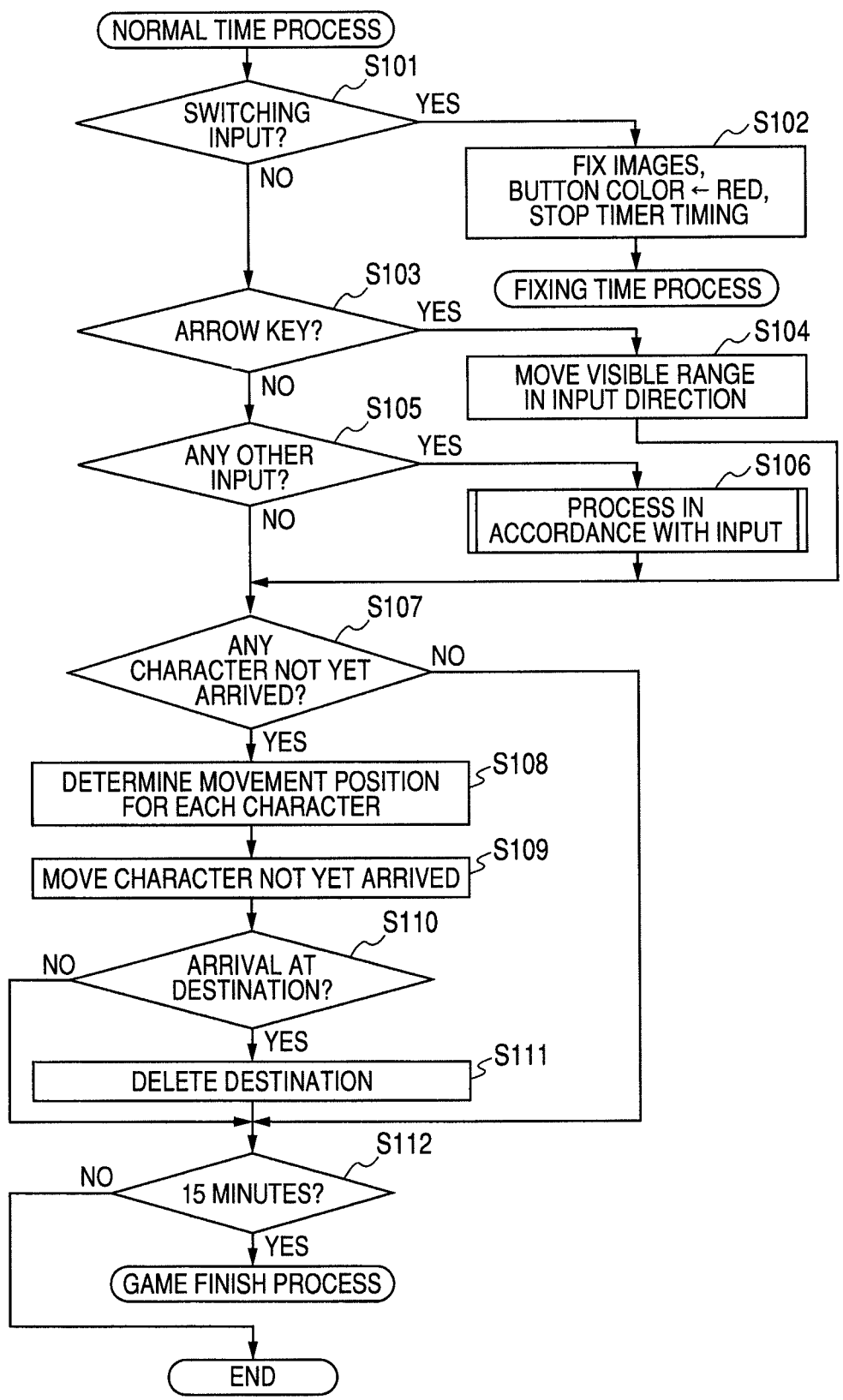

FIG. 6 is a flowchart showing a process carried out on the per frame period basis at the normal time in the simulation RPG according to the embodiment. The process of the flowchart is a process in which the CPU core 21 executes the game program loaded into the WRAM 22 from the ROM 171 of the cartridge 17.

In the normal time process, a position is touch input from the touch panel 13, and the CPU core 21, according to whether the touch input position is a coordinate position in which the switching button 104 is displayed, determines whether or not the switching operation has been carried out (step S101). If the switching operation has been carried out, the CPU core 21 instructs the first GPU 24 and the second GPU 26 to fix the displays of the first LCD 11 and the second LCD 12 as images being displayed on the first LCD 11 and the second LCD 12 at the present moment. At this point, the CPU core 21 sets the color of the switching button 104 to be red, and stops the timing of the timer 101 (step S102). Then, the CPU core 21 shifts to a fixing time process. Details of the fixing time process will be described hereafter.

If the switching operation has not been carried out, the CPU core 21 determines whether or not an input has been carried out from the arrow key 14c (step S103). If an input has been carried out from the arrow key 14c, the CPU core 21 moves the visible range in an input direction (step S104). Then, the CPU core 21 proceeds to a process of step S107.

If no input has been carried out from the arrow key 14c, the CPU core 21 determines whether or not another input has been carried out from the operating switches 14 (step S105). If no other input has been carried out, the CPU core 21 proceeds to the process of step S107. If another input has been carried out, the CPU core 21 carries out a process corresponding to the relevant input (for example, causing a player character 100 to acquire the item from the treasure box 108, and so on) (step S106). Then, the CPU core 21 proceeds to the process of step S107.

In step S107, the CPU core 21, according to whether or not there is a player character 100 whose destination 203 has been registered in the character management table 200, determines whether or not there are player characters 100 in the process of moving which have not yet arrived at the destination 203 set by means of the destination designating operation. If there are no player characters 100 which have not arrived at the destination 203, the CPU core 21 proceeds to a process of step S112.

If there are player characters 100 which have not yet arrived at the destination 203, the CPU core 21 determines positions via which all the player characters 100 which have not yet arrived at the destination 203 move in a current frame period toward a position of the destination 203 from their current positions 202 (step S108). Then, the CPU core 21 moves all the player characters 100, which have not yet arrived, to the determined positions, and updates the positions 202 of the relevant player characters 100 in the character management table 200. At this point, if the character-by-character search range 105 set for the moved player characters 100 is positioned in the unsearched range, a portion of the unsearched range which has fallen within the relevant character-by-character search range 105 becomes the searched range 106, and is changed in brightness. At this point, if there is the prescribed point at which the treasure box 108 is disposed within the range (now high in brightness) which has newly become the searched range 106, the relevant treasure box 108 is displayed on the game screen and the map screen (step S109).

Then, the CPU core 21, according to whether or not the position 202 of each moved player character 100 registered in the character management table 200 matches the position of the destination 203 thereof, determines whether or not the player characters 100 have arrived at the destination 203 (step S110). If there exists no player character 100 which has arrived at the destination 203, the CPU core 21 proceeds to a process of step S112. If there exists any player character 100 which has arrived at the destination 203, the CPU core 21 clears the destination 203 of the relevant player character 100 registered in the character management table 200 (step S111). Then, the CPU core 21 proceeds to the process of step S112.

In step S112, the CPU core 21 determines whether or not the timer 101 which has started timing at the stage start time has timed 15 minutes. If it has not timed 15 minutes, the CPU core 21 finishes the processes of the flowchart. If it has timed 15 minutes, it is time to finish the stage being carried out at the present moment, and the CPU core 21 carries out a game finishing process in which the game is finished in the event that the clearing condition set for the relevant stage is not met.

Figure 7:
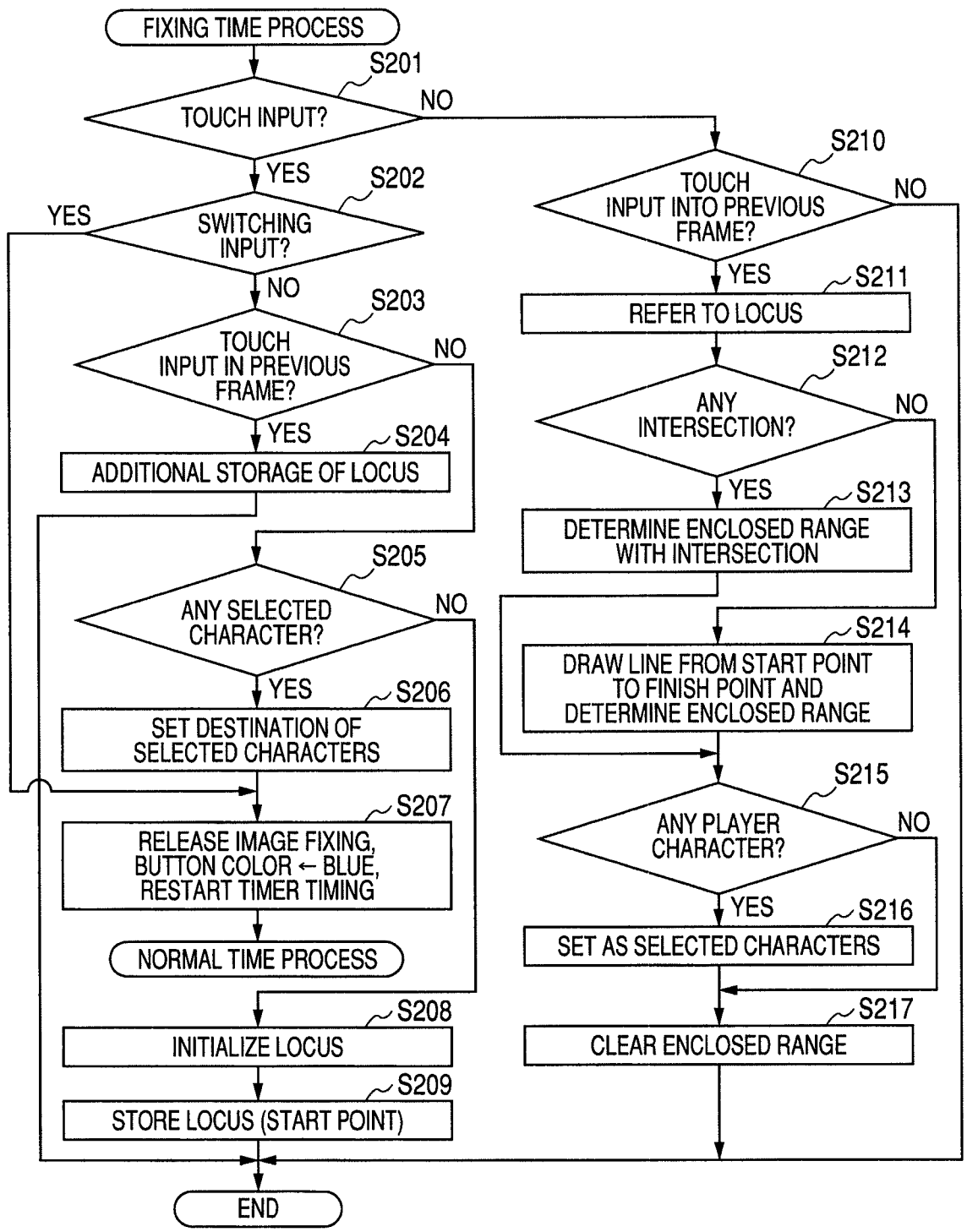

FIG. 7 is a flowchart showing a process carried out on the per frame period basis at the image fixing time. The movements of the player characters 100 stop at the image fixing time.

In the fixing time process, the CPU core 21 determines whether or not a touch input has been carried out from the touch panel 13 (step S201). If a touch input has been carried out, the CPU core 21, according to whether or not a touch input position is a coordinate position in which the switching button 104 is displayed, determines whether or not the switching operation has been carried out (step S202). If the switching operation has been carried out, the CPU core 21 proceeds to a process of step S207.

If the switching operation has not been carried out, the CPU core 21 determines whether or not the touch input (excluding the switching operation) has been carried out in the previous frame period (step S203). If the touch input (excluding the switching operation) has been carried out in the previous frame period, the CPU core 21 stores a currently input position as an addition in a locus storage area of the WRAM 22 as a locus (step S204). Then, the CPU core 21 finishes the processes of the flowchart.

If the touch input (excluding the switching operation) has not been carried out in the previous frame period, the CPU core 21 determines whether or not any selected characters are set (step S205). If any selected characters have been set, it signifies that the destination designating operation has been carried out, and the CPU core 21 registers a position corresponding to the touch input position as the destination 203 in the character management table 200 (step S206) for each of the player characters 100 set as the selected characters. Then, the CPU core 21 proceeds to step S207.

In step S207, the CPU core 21 instructs the first GPU 24 and the second GPU 26 to release the fixing of the images displayed on the first LCD 11 and the second LCD 12. At this point, the CPU core 21 sets the color of the switching button to be blue, and restarts the timing of the timer 101. Then the CPU core 21 shifts to the previously described normal time process.

If no selected characters have been set in the process of step S205, it signifies that the enclosing operation has been started, and the CPU core 21 initializes the locus storage area of the WRAM 22 (step S208). Then, the CPU core 21 stores the currently input position, as the start point of the locus, in the locus storage area of the WRAM 22 (step S209). Then, the CPU core 21 finishes the processes of this flowchart.

If no touch input has been carried out, the CPU core 21 determines whether or not a touch input (excluding the switching operation) has been carried out in the previous frame period (step S210). If no touch input (excluding the switching operation) has been carried out in the previous frame period, the CPU core 21 immediately finishes the processes of this flowchart. If a touch input (excluding the switching operation) has been carried out, it signifies that the enclosing operation has been finished, and the CPU core 21 refers to the locus from the start point to the finish point input by means of the enclosing operation with the start point and the finish point touch input in the previous frame period (step S211).

Then, the CPU core 21 determines whether or not there is an intersection in the locus from the start point to the finish point input by means of the enclosing operation (step S212). If there is an intersection, the CPU core determines an area closed by the intersection as the enclosed range (step S213). Then, the CPU core 21 proceeds to a process of step S215. If there is no intersection, the CPU core 21 determines a closed area (in the event of a plurality of the closed areas, a whole thereof) formed by a line drawn from the start point to the finish point, and the locus, which have been input by the enclosing operation, as the enclosed range (step S214). Then, the CPU core 21 proceeds to the process of step S215. However, if no closed area is formed by the line drawn from the start point to the finish point and the locus, the CPU core 21 proceeds to the process of step S215 leaving no enclosed area determined.

In step S215, the CPU core 21 determines whether or not the player characters 100 are being displayed positioned in the determined enclosed range (step S215). If no enclosed range has been determined, it is always determined that no player characters 100 are being displayed. If no player characters 100 are being displayed, the CPU core 21 proceeds to a process of step S217. If any player character 100 is being displayed, the CPU core 21 sets all the player characters 100, being displayed positioned in the determined enclosed range, as the selected characters (step S216). Then, the CPU core 21 proceeds to the process of step S217. In step S217, the CPU core 21 clears the determined enclosed range, and finishes the processes of this flowchart.

As described heretofore, in the simulation RPG according to the embodiment, when the enclosing operation has been carried out at the image fixing time in such a way as to enclose the positions of the player characters 100 displayed on the game screen of the second LCD 12, all the player characters 100 being displayed positioned in the range enclosed by means of the relevant operation are set as the selected characters.

When the destination designating operation has been carried out with respect to the positions displayed on the game screen of the second LCD 12, a position on the field corresponding to the position touch input by means of the relevant operation is set as the destination 203 of the player characters 100 determined as the selected characters. When the destination 203 has been set, the image fixing is released, and next positions via which all the player characters 100, the destination 203 of which has been set, head toward the destination from their present positions are determined, one in each subsequent frame period. Then, the player characters 100 are each automatically moved on the field at the certain speed toward the destination through the determined position.

In this way, the player can select player characters 100 to be moved, from among the plurality of player characters 100 caused to participate in the game, and move all the selected player characters 100 toward a desired position on the field by means of one destination designating operation. Even in the event that there are a plurality of player characters 100 to be moved, it is possible, by means of the one destination designating operation, to move the plurality of player characters 100 toward the desired position on the field.

Also, even in the event that the destination 203 has been set for the plurality of player characters 100, positions via which the player characters 100 head toward the position of the destination 203 are determined one for each. For this reason, for example, in the event that the enclosing operation is carried out in such a way as to enclose a plurality of player characters 100 disposed in positions 202 relatively far apart from each other on the field (in other words, display positions on the game screen of the player characters 100 are relatively far apart from each other), it is possible to move the plurality of player characters 100 toward a desired position on the field corresponding to the position touch input afterward by means of the destination designating operation, and dispose them in positions 202 relatively close to each other on the field (in other words, assemble them in a position in which their display positions on the game screen are relatively close to each other).

Furthermore, in the RPG according to the embodiment, the operation setting the selected characters (the enclosing operation) and the operation designating the destination 203 (the destination designating operation) are quite independent operations. By this means, it does not happen that, by the player attempting to designate the destination 203 to a desired position, even a player character 100 which the player does not want to move as far as the relevant destination 203 is set as the selected character.

A range of the game screen which can be displayed on the second LCD 12, being a range indicated by the visible range frame 102 on the map screen displayed on the first LCD 11, is a range narrower than the whole of the field on which the player characters 100 can move. The player, by moving the visible range frame 102 by means of the operation of the arrow key 14c, can change its position on the field displayed on the game screen of the second LCD 12. The operation setting the selected characters (the enclosing operation) and the operation designating the destination 203 (the destination designating operation) being the independent operations, the player can move the visible range frame 102 by means of the operation of the arrow key 14c during both operations. By this means, the player, being able to set a whole range on the field as the destination 203, can move a desired player character 100 to an optional position on the field.

Also, the enclosing operation can also be carried out with respect to a player character 100 which has not yet arrived at the destination 203 (is in the process of moving) at the image fixing time. When the player wants, partway through, to change the destination 203 of the player character 100 in the process of moving on the field, by newly carrying out operations of the same operability: the switching operation, the enclosing operation and the destination designating operation, it is possible to move the player characters 100 from the positions 202 from which they are in the process of moving to a new desired position on the field.

Also, at a new image fixing time, the enclosing operation setting the selected characters is an operation independent of an enclosing operation of first setting player characters 100 currently in the process of moving (it is also acceptable that some have already completed the movements) as the selected characters. That is, in the event that there are a plurality of the player characters 100 currently in the process of moving, it is possible to set some of the player characters 100 as new selected characters by means of the enclosing operation, and move them toward a position of the destination 203 on the field corresponding to the position newly designated by means of the destination designating operation. For this reason, it is also possible to easily carry out, for example, an operation by which the player characters 100 are moved as a whole in a right direction of the game screen but, when they have moved a certain amount in the right direction, some player characters 100 are moved in a downward direction, and some other player characters 100 are moved in an upward direction.

Also, the character-by-character search range 105 is set for each player character 100 participating in the game. The character-by-character search range 105 moves along with a movement of a corresponding player character 100, and an image in a range on the field (the searched range 106) once included in the character-by-character search range 105, becoming high in brightness, is visible to the player on the map screen and the game screen. As it is possible, on the map screen of the first LCD 11 and the game screen of the second LCD 12, to clearly distinguish a range through which any player character 100 has moved from a different range, the player can easily carry out an operation of, for example, attempting to move the player characters 100 to the unsearched range.

Also, there is the treasure box 108 at the prescribed point on the field which is the movement space of the player characters 100. The treasure box 108 does not fall within the searched range 108 until it is visibly displayed on the map screen and the game screen. Herein, in order for the player to find the treasure box 108 disposed on the field, it is necessary to expand the searched range 106 by means of the movement of the player characters 100. For this reason, it is possible to prompt the player to operate in such a way as to move the player characters 100 to the unsearched range.

Also, the game is over in the event that the clearing condition set for each stage cannot be met before the timer 101, with which the timing is started when the player characters 100 have been disposed on the field (the stage start time), times 15 minutes. Although the clearing condition set for each stage, by the searched range 106 expanding, becomes easy to meet, a substantial limitation occurs on a time for which it is possible to move each of a plurality of player characters 100 on the field, that is, a time for which it is possible to expand the searched range 106 on the field (in the event that it takes time to expand the searched range 106, it also becomes difficult to clear the stage). By this means, it is possible to further prompt the player to operate in such a way as to move the player characters 100 to the unsearched range.

Also, the player can switch the game condition from the normal time to the image fixing time by means of the switching operation. At the image fixing time, the movements of the player characters 100 stopping, the player characters 100 do not move on the field. In this way, at the image fixing time, it is possible for the player, by stopping all the movements on the field of the player characters 100, to easily designate the selected characters by carrying out the enclosing operation in such a way as to enclose the player characters 100. Furthermore, the switching operation fixing the images, the enclosing operation setting the selected characters, and the destination designating operation designating the destination 203 can all be carried out by an intuitive input of inputting coordinate positions on the touch panel 13, facilitating the operations.

Also, the player can switch the game condition from the image fixing time to the normal time by means of the touch input from the switching button 104. In this way, even after fixing the images by means of the touch input from the switching button 104 and stopping the movements of the player characters 100, it is possible, by carrying out the touch input from the switching button 104, to release the relevant image fixing. By this means, even in the event that the player has erroneously carried out the touch input from the switching button 104, it is possible to restart the movement of each player character 100 from a condition in which the images are unfixed.

Also, by arranging in such a way that it is possible to designate the stopping and releasing of the movements of the player characters 100, after having once stopped all the movements of the player characters 100, the player being given a chance to reconsider whether or not to change an aspect of the movement on the field of each player character 100, it is possible to easily implement the game. Furthermore, the timing of the timer 101 stops at the image fixing time. By this means, substantially, no time constraints occur in the enclosing operation or the destination designating operation, and the player is given time, without constraints, to consider whether or not to change the aspect of the movement on the field of each player character 100, so it is possible to easily implement the game.

Also, all the player characters 100 positioned in the enclosed range are set as the selected characters. In the event that there is an intersection in the locus from the start point to the finish point input by means of the enclosing operation, it is possible to judge by an easy process that the closed area of the locus formed by the intersection is the enclosed range. Contrarily, in the event that there is no intersection in the locus from the start point to the finish point input by means of the enclosing operation, as it is sufficient to judge that a closed area (in the event of a plurality of the closed areas, a whole thereof) formed by the line drawn from the start point to the finish point and the locus is the enclosed range, the player need not be required to carry out any meticulous operation in order to set the selected characters.

Also, at both the normal time and the image fixing time, the map screen, which is the map of the whole field formed in the hypothetical space, is displayed on the first LCD 11, and the game screen, which is a portion (a range in the visible range frame 102) of the field in the hypothetical space, is displayed on the second LCD 12. Herein, the player, as well as being able to easily ascertain the whole structure of the field from the map screen, can ascertain details of a positional relationship between the individual player characters 100 from the game screen by seeing only a portion thereof on the field with a more detailed display.

Then, as the touch panel 13 is arranged in such a way that a coordinate position corresponding to the game screen displayed on the second LCD 12 is input therefrom, it is possible to individually select which player characters 100, from among the player characters 100 displayed on the game screen, are to be set as the selected characters. Also, although only the inside of the visible range frame 102, which is the portion of the field, is displayed as the game screen at one time, the visible range frame 102 can be moved by means of the operation of the arrow key 104c. The player, by moving the visible range frame 102, can ascertain the details of the positional relationship between the player characters 100 on the whole field.

The invention, not being limited to the heretofore described embodiment, can be variously modified and applied. Hereafter, a description will be given of modified aspects of the heretofore described embodiment which are applicable to the invention.

In the heretofore described embodiment, the player characters 100 move automatically on the field at the certain speed toward the destination 203. As opposed to this, it is also acceptable that the movement speed of the player characters 100 either varies from one player character 100 to another, or is changed depending on a prescribed condition. Also, it is also acceptable that the movement speed of the player characters 100 is determined in such a way that all the player characters 100 set as the selected characters at the same time arrive at the destination 203 at the same time. In these cases, it is possible to set a parameter having an effect on the movement for each player character 100. Herein, it is also acceptable that the parameter of the movement varies according to the game implementation.

In this case, it is also acceptable that there exists a player character 100 which cannot move even though it is set as the selected character (that is, the destination 203 is not set for it), or a player character 100 having the destination 203 set for it which, by moving by itself too, has an effect on a movement of another player character 100 (such as by reducing the movement speed of another player character 100). By this means, a more detailed operation is required for the enclosing operation, increasing a gaming aspect.

In the heretofore described embodiment, the next position, via which each player character 100 whose destination 203 has been set heads toward the position of the destination from the present position, being determined on the per frame period basis, each player character 100 is moved. As opposed to this, it is also acceptable that movement routes through which the player characters 100 head toward the destination 203 are determined by another method. For example, it is also acceptable that all the movement routes from the positions of the player characters 100 to the position of the destination 203 are determined when the destination 203 has been set. Also, it is possible to determine the movement routes of the player characters 100 in such a way that all the player characters 100, having the destination 203 set for them as the selected characters at the same time, arrive at the destination 203 at the same time (in the event that the movement speeds are the same, movement distances are made the same. Or alternatively, the movement speeds are made different.).

In the heretofore described embodiment, the character-by-character search range 105, which has the circular shape of the prescribed radius centered around the position on the field of each of the player characters 100 participating in the game, is set for each of them. As opposed to this, it is also acceptable that a size of the character-by-character search range 105 either varies from one player character 100 to another, or is changed depending on the prescribed condition. In the case in which the movement speed varies from one player character 100 to another, it is possible to make the size of the character-by-character search range 105 of a player character 100, the movement speed of which is high, smaller than that of a player character 100 whose movement speed is low. Also, for example, in the event that there are some items which increase or reduce the size of the character-by-character search range 105, the gaming aspect is increased.

In the heretofore described embodiment, in the event that there is any intersection in the locus from the start point to the finish point input by means of the enclosing operation, an area closed by the relevant intersection is determined as the enclosed range, while, in the event that there is no intersection in the locus from the start point to the finish point input by means of the enclosing operation, a closed area (in the event of a plurality of the closed areas, a whole thereof) formed by the line drawn from the start point to the finish point and the locus is determined as the enclosed range. As opposed to this, it is also acceptable that the enclosed range is determined by another method. For example, it is also acceptable to draw tangent lines at the start point and the finish point with respect to the locus from the start point to the finish point input by means of the enclosing operation (in a direction opposite to an input direction of the locus at the start point, and in the input direction of the locus at the finish point), treat the tangent lines in the same way as the input locus, and determine an area, which is closed by an intersection between the two tangent lines or an intersection between one tangent line and the original input locus, as the enclosed range.

Also, it is also acceptable that whether or not each player character 100 is positioned in the enclosed range is determined on the basis of each player character 100. For example, it is also acceptable that whether or not each player character 100 is positioned in the enclosed range is determined depending on whether or not an angle at which the locus input by means of the enclosing operation exists on a semi-straight line extended in a radial direction from the position of each player character 100 is 300 degrees or more.

In the heretofore described embodiment, the timing of the timer 101 stops at the image fixing time. As opposed to this, it is also acceptable, by arranging in such a way that the timing of the timer 101 does not stop at the image fixing time, and a time limit or a required time is set up for the timer which times at the image fixing time, to have an effect on the game implementation (for example, the movement speed of the player characters 100, the size of the character-by-character search range 105, and the like). By this means, substantially, the time constraints occur in a series of operations (the switching operation, the enclosing operation and the destination designating operation), improving the gaming aspect.

In the heretofore described embodiment, the images are fixed, and the movements of the player characters 100 are stopped by means of the switching input at the normal time. As opposed to this, it is also acceptable that the images are not fixed, and the movements of the player characters 100 are not stopped by means of the switching input at the normal time. In this case, it is difficult to enclose the player characters 100 in the process of moving by means of the enclosing operation, increasing the gaming aspect.

In the heretofore described embodiment, the description has been given exemplifying with the case in which the invention is applied to the simulation RPG in which the plurality of player characters 100 are moved on the field, but no reference has been made to an existence of a character other than the player characters 100. Naturally, in the simulation RPG, generally, one or more enemy characters also existing on the field, when an enemy character approaches a player character 100 from a prescribed direction, the player character 100 is attacked by the enemy character, and when a player character 100 approaches an enemy character from a prescribed direction, it can attack the enemy character.

In this way, considering that the enemy characters exist on the field in the simulation RPG, in order for the player characters 100 to make unerring attacks on the enemy characters while avoiding attacks from the enemy characters, a position to which the player characters 100 are moved in accordance with movements of the enemy characters is important. For this reason, in order to move the player characters 100 to an optimum position with respect to positions of the enemy characters moving on the field, it is necessary to carry out detailed enclosing operation and destination designating operation, increasing the gaming aspect.

Furthermore, in this case, it is also acceptable that the movements of the enemy characters are not stopped even though the movements of the player characters 100 are stopped at the image fixing time. In this case, even while the selection of the selected characters and the designation of a destination are being carried out, the enemy characters make attacks on the player characters 100, although the player characters 100 cannot make any attacks on the enemy characters, and in order to stop this kind of disadvantageous condition continuing, it is necessary to quickly carry out the series of operations (the switching operation, the enclosing operation and the destination designating operation). By this means, substantially, the time constraints occur in the series of operations (the switching operation, the enclosing operation and the destination designating operation) before the player characters 100 are moved, increasing the gaming aspect.

Also, it is also acceptable that other characters existing in the hypothetical space do not make attacks on the player characters 100, but impede the game the player implements (such as by restoring the searched range 106 to the unsearched range). It is also acceptable that it is possible, by delivering attacks on such other characters too from the player characters 100 in accordance with a movement position and direction, to defeat the other characters. In this case, a gaming aspect occurs in which it is necessary to move the player characters 100 in such a way that the other characters do not enter a place which has once been made the searched range 106, and the detailed operation is required by means of the enclosing operation and the destination designating operation, so the gaming aspect is increased.

In the heretofore described embodiment, the description has been given exemplifying with the case in which the invention is applied to the simulation RPG, but the invention can also be applied to other kinds of game. The invention can also be applied to, for example, a prisoner's base (a kind of puzzle game) in which a team of the player characters 100 and a team of the other characters expand their searched ranges by team. The searched ranged 106 of the player characters 100 and the searched range of the other characters arise in this kind of game and, in the unsearched range, a range which has become the character-by-character search range 105 set for the player characters 100 is the searched range 106 of the player characters 100, while a range which has become a character-by-character search range set for the other characters is the searched range of the other characters. Then, when the time limit has expired or the unsearched range has disappeared, an outcome is determined according to a size of the searched ranges.

In this kind of game, it is also acceptable that the other characters which are opponents of the player characters 100 are either characters which are program controlled by the CPU core 21 of the player's own game apparatus 1, or characters which are operated by another player. A game apparatus which another player operates can be another game apparatus which is communicably connected in peer-to-peer fashion or via a server device with the game apparatus 1 which the relevant player operates (however, one capable of executing a program similar to, and carrying out an image display similar to, those of the game apparatus 1 which the relevant player operates).

In this case, it is possible to prompt the player to operate in such a way as to first move his or her own player characters 100 to the unsearched range. Also, as a match-up between the player characters 100 and the other characters (a match-up between the player and a computer or another player) is realized, the excitement occurs in the game.

In this kind of game, it is possible to arrange in such a way that the player can acquire the item only from the treasure box 108, among the treasure boxes 108 at the prescribed points on the field, which is in the searched range 106 of the player characters 100. By this means, it is possible to prompt the player to operate in such a way as to first move his or her player characters 100 to the unsearched range in order to find a disposition position of the treasure box 108 earlier than the opponents. Herein, it is also acceptable that the outcome of the game is determined in accordance with the item acquired from the treasure box 108.

In the heretofore described embodiment, the range (the visible range frame 102) displayed on the game screen of the second LCD 12 moves by means of the operation of the arrow key 14c. As opposed to this, it is also acceptable to cause a button etc. with which is input an instruction to move the visible range frame 102, to be displayed on the second LCD 12, and the visible range frame 102 to be moved in the instructed direction by means of the touch input from the touch panel 13. In this case, the input for moving the visible range frame 102 also being an operation having a uniformity with other operations (the switching operation, the enclosing operation and the destination designating operation) of inputting a coordinate position on the touch panel 13, the player can easily carry out the operation.

In the heretofore described embodiment, the visible range frame 102 constantly has the certain size. As opposed to this, it is also acceptable that the size of the visible range frame 102 either is changeable by means of the operation by the player, or is determined by a prescribed method in accordance with the game implementation. In the event that the size of the visible range frame 102 narrows, a field of a narrow range is displayed on the game screen of the second LCD 12 and, conversely, in the event that the size of the visible range frame 102 widens, a field of a wide range is displayed on the game screen of the second LCD 12.

In the heretofore described embodiment, the time limit is set up for each stage. As opposed to this, it is also acceptable that the time limit is not set up for each stage. Even in the event that the time limit is not timed, a player's psychology works on many players in that they want to turn as wide a range on the field as possible into the searched range 106 within the same time, or they want to turn the whole field into the searched range 106 in as short a time as possible. The player's psychology working as a substantial time limit, although not true of all players, for many players it is not the case that a large difference in the advantage of the invention occurs depending on a difference of whether or not the time limit is timed by the timer 101 which starts timing when the stage has been started.

In the heretofore described embodiment, when the switching button 104 has been operated at the normal time, the images are fixed, and the enclosing operation and the destination designating operation are carried out on the game screen displayed on the second LCD 12. As opposed to this, it is also acceptable that, after the selected characters have been set by means of the enclosing operation, the image (the map screen) displayed on the first LCD 11 is interchanged with the image (the game screen) displayed on the second LCD 12, and the destination designating operation is carried out in a condition in which the map screen is displayed on the second LCD 12. By this means, it is possible to more easily carry out an operation setting a position on the field, which is far away from the positions of the selected characters and is not included on the game screen at the present moment, as the destination of the selected characters.

In the heretofore described embodiment, information indicating the condition of the player characters 100 (whether or not they are in the process of moving or are the selected characters, and the like) is not displayed on the map screen of the first LCD 11 and the game screen of the second LCD 12. As opposed to this, it is also acceptable to display the information indicating the condition of the player characters 100 on the map screen and/or the game screen in such a way as to affix it to each player character 100. For example, it is possible to display information indicating whether or not each player character 100 is in the process of moving, or information indicating whether or not it is set as the selected character, on the map screen and/or the game screen in such a way as to affix it to each player character 100.

In the heretofore described embodiment, the game device 1 includes two display devices, the first LCD 11 and the second LCD 12. As opposed to this, it is also acceptable to include one display device. In the case in which a touch panel is used as a device with which a coordinate position is input, it is possible to arrange in such a way that the touch panel is disposed on a front surface of the one display device. Also, in the case of only one display device, it is possible to arrange in such a way that the image can be switched to the map screen and the game screen by means of a prescribed operation by the player.

In the heretofore described embodiment, the description has been given exemplifying with the case in which the simulation RPG to which the invention is applied is executed in the game apparatus 1 including the two display devices, the first LCD 11 and the second LCD 12, and a pointing device, the touch panel 13. However, it is also acceptable that a computer other than the game apparatus 1 executes a game to which the invention is applied, as long as it includes at least a display device which displays the images of the game, and an input device which, by allowing the player to perform a circling movement operation, can carry out an input by means of the enclosing operation. The computer device which executes the game to which the invention is applied may be either a specialized gaming machine or a general-purpose machine such as a personal computer, whether it is portable or stationary.

In the heretofore described embodiment, it is arranged that the input by means of the enclosing operation is carried out by causing the player to perform the circling movement operation on the touch panel 13 installed on the front surface of the second LCD 12. Naturally, as the device with which the enclosing operation is input, not being limited to the touch panel 13, it is also acceptable to use another pointing device, such as a mouse with which a coordinate input is carried out according to a position of a cursor displayed on the display device.

Also, in a case of using, as a platform, a stationary specialized gaming machine or the like, which includes a control pad with a built-in position signal output device installed above or below the display device, a multiaxial acceleration sensor, and a position signal sensor detecting a position signal transmitted from the position signal output device, it is also acceptable to use one which, according to inclination information of the control pad detected from the multiaxial acceleration sensor, and a detection condition of the position signal detected by the position signal sensor, determines whereabouts on a displayed game screen the control pad is indicating, and inputs a coordinate position corresponding to the determined position.

In the heretofore described embodiment, the programs and data of the game apparatus 1 are stored in the ROM 171 of the game cartridge 17 and distributed. Naturally, the recording medium storing these programs and data, not being limited to this kind, can also utilize an optical and/or magnetic disk device (a flexible disk, a CD-ROM, a DVD-ROM or the like) in accordance with an aspect of the computer device which serves as the platform. In a case in which a computer device including a fixed disk device is used as the platform, it is also acceptable to store these programs and data in advance in the fixed disk device and distribute them.

Furthermore, in a case of utilizing a computer device, which can communicate with another computer device via a network, as the platform, it is also acceptable to store these programs and data in a fixed disk device included in a server device existing on the network, and deliver them via the network.

What is claimed is:

1. A game apparatus, including a display for displaying a game screen and a coordinate position inputter for inputting coordinate positions corresponding to the game screen, configured to execute a game comprising a plurality of player characters moving on a map, the game apparatus comprising:
    a map display configured to display at least a portion of the map on the game screen, the plurality of player characters positioned on the map in accordance with present positions of the plurality of player characters;
    an enclosing coordinate inputter configured to input a plurality of selecting coordinate positions from the coordinate position inputter by an enclosing operation of a player for selecting at least one player character, from among the plurality of player characters positioned on the portion of the map that is displayed on the game screen;
    a setting processor configured to, when the plurality of selecting coordinate positions form a closed area, select the at least one player character based on the formed closed area, the setting processor further configured to, when the plurality of selecting coordinate positions do not form the closed area, determine the closed area based on a start point and a finish point of the plurality of selecting coordinate positions and select the at least one player character based on the determined closed area;
    a position inputter configured to input a destination coordinate position corresponding to a desired position on the portion of the map from the coordinate position inputter by a destination designating operation of the player after the plurality of selecting coordinate positions for selecting the at least one player character are input by the enclosing coordinate inputter;
    a movement route determiner configured to determine a movement route for each of the at least one player character for moving the at least one player character toward the desired position on the map corresponding to the destination coordinate position input by the position inputter; and
    a player character mover configured to move the at least one player character on the map in accordance with the movement route determined for each of the at least one player character by the movement route determiner,
    wherein the enclosing operation of the player is independent of the destination designating operation of the player,
    the player character mover is configured to stop movements of the at least one player character on the map and partway through the movement route when the player switches a game condition from a normal time state to an image fixing time state before the at least one player character is at the desired position,
    the enclosing coordinate inputter is configured to receive the enclosing operation of the player for selecting any of the at least one player character during the image fixing state and when the movements of the at least one player character on the map are stopped for facilitating changing of the desired position, and
    the player character mover is configured to restart the movements of the at least one player character in accordance with the movement route when the player switches the game condition from the image g time state to the normal time state and the enclosing operation is not received during the image fixing state for facilitating reconsideration of the changing of the desired position.

2. The game device according to claim 1, wherein
    the enclosing coordinate inputter is further configured to input the plurality of selecting coordinate positions for selecting the at least one player character from the coordinate position inputter when the at least one player character is moved on the map by the player character mover in accordance with the movement route determined by the movement route determiner, wherein
    the movement route determiner comprises a changed movement route determiner which, when the plurality of selecting coordinate positions for selecting the at least one player character is input when the movement route determiner is moving the at least one player character, and when a new destination coordinate position corresponding to a new desired position on the map is newly input by the position inputter, determines a new movement route for each of the at least one player character for moving the at least one player character toward the new desired position on the map corresponding to the new destination coordinate position newly input by the position inputter, and
    the player character mover is further configured to move the at least one player character on the map in accordance with the new movement route in response to the movement route determiner determining the new movement route.

3. The game device according to claim 1, further comprising:
    a stop instruction inputter configured to, on a basis of a stop operation by the player, input a stop instruction to stop the movements of the at least one player character on the map; and
    a player character stopper configured to, when the stop instruction is input from the stop instruction inputter, stop the movements of the at least one player character on the map, wherein
    the enclosing coordinate inputter is further configured to, when the movements of the at least one player character on the map are stopped by the player character stopper, to input the plurality of selecting coordinate positions for selecting the at least one player character from the coordinate position inputter.

4. The game device according to claim 3, further comprising:
    a stop instruction icon display configured to display a stop instruction icon on the display, the stop instruction icon for inputting the stop instruction to stop the movements of the at least one player character on the map, the stop instruction icon being displayed either apart from or superimposed on the game screen, wherein the stop instruction inputter is further configured to, when a stop coordinate position corresponding to a display position of the stop instruction icon displayed by the stop instruction icon display is input from the coordinate position inputter, input the stop instruction to stop the movements of the at least one player character on the map.

5. The game device according to claim 3, further comprising:
a release instruction inputter configured to, on the basis of a release operation by the player, input a release instruction to release stopping of the movements of the at least one player character on the map by the player character stopper, wherein
the player character stopper is configured to stop the movements of the at least one player character on the map from when the stop instruction is input by the stop instruction inputter until one of the desired coordinate position is input by the position inputter and the release instruction is input by the release instruction inputter.

6. The game device according to claim 5, further comprising:
a release instruction icon display configured to display a release instruction icon on the display, the release instruction icon for inputting the release instruction to release the stopping of the movements of the at least one player character on the map, the release instruction icon being displayed either apart from or superimposed on the game screen, wherein
the release instruction inputter is further configured to, when a release coordinate position corresponding to a display position of the release instruction icon displayed by the release instruction icon display is input from the coordinate position inputter, input the release instruction to release the stopping of the movements of the at least one player character.

7. The game device according to claim 1, wherein
the map display is further configured to display a completed movement range, in a prescribed range of the map from a movement route on which any of the at least one player character has been moved by the player character mover, in a display aspect differing from that of a range not included in the completed movement range.

8. The game device according to claim 7, wherein
at least one game object having a predetermined effect on an implementation of the game is positioned on the map, and
the map display is further configured to only display a game object, from among the at least one game object positioned on the map, on the game screen when the game object is positioned in the completed movement range.

9. The game device according to claim 8, further comprising:
a game object effect activator which activates the predetermined effect set for the at least one game object when the game object is positioned in the completed movement range.

10. The game device according to claim 7, further comprising:
a game starter configured to position the plurality of player characters in initial positions on the map, start the game, and enable the enclosing coordinate inputter to input the plurality of selecting coordinate positions for selecting the at least one player character;

a game timer configured to measure a time elapsed after the start of the game by the game starter; and
a game finisher configured to finish the game by stopping movements of the at least one player character on the map when the elapsed time measured by the game timer equals a predetermined time.

11. The game device according to claim 1, wherein
at least one non-player character moves on the map, and
the map display comprises:
an unentered range display configured to cause an unentered range in the map, outside a predetermined range from the at least one player character and a non-character movement route on which the at least one non-player character has moved, to be displayed in a first display aspect;
a player character range display configured to cause a first portion of the unentered range to be displayed in a second display aspect when the at least one player character moves within the prescribed range of the first portion of the unentered range; and
a non-player character range display configured to cause a second portion of the unentered range to be displayed in a third display aspect when the at least one non-player characters moves within the prescribed range of the second portion of the unentered range.

12. The game device according to claim 1, further comprising:
an intersection detector configured to detect an intersection produced in a coordinate position input path of the enclosing coordinate inputter based on the plurality of selecting coordinates; and
an enclosed range determiner configured to, when the intersection detector detects the intersection, determine the closed area formed by the coordinate position input path of the enclosing coordinate inputter, due to the intersection, the closed area comprising a range enclosed by the plurality of selecting coordinate positions input by the enclosing coordinate inputter.

13. The game device according to claim 1, wherein
the setting processor, when the plurality of selecting coordinate positions do not form the closed area, determines the closed area by interconnecting the start point and the finish point of the plurality of selecting coordinate positions with a line.

14. The game device according to claim 1, wherein
the display comprises a first display and a second display,
the map display comprises a whole map display configured to display the map on the first display as a first portion of the game screen, and a partial map display configured to movably display the portion of the map on the second display as a second portion of the game screen, and
the coordinate position inputter is configured to input the coordinate positions corresponding to the game screen on the first display and the second display.

15. The game device according to claim 1, wherein
the coordinate position inputter comprises a touch panel which is disposed on a front surface of the display, configured to transmissively show the game screen in accordance with a position touched on the touch panel, and configured to input the coordinate positions corresponding to the game screen.

16. The game device according to claim 1, wherein
the coordinate position inputter comprises a control pad including a multiaxial acceleration sensor to detect a motion of the coordinate position inputter and a position signal sensor to detect a position signal transmitted from a signal output disposed on a periphery of the display, and is configured to display the game screen and input the coordinate positions corresponding to the game screen in accordance with a detection result of the multiaxial acceleration sensor and the position signal sensor.

17. A game implementation method executable in a computer comprising a display that displays a game screen, a coordinate position inputter that inputs coordinate positions corresponding to the game screen, and a storage that stores information of a game, the game including a plurality of player characters that move on a map, the game implementation method comprising:

storing a present position on the map for each of the plurality of player characters;

displaying at least a portion of the map on the game screen, the plurality of player characters being positioned in accordance with the present position of each of the plurality of player characters;

inputting, from the coordinate position inputter by an enclosing operation, selecting coordinate positions for selecting at least one player character, from among the plurality of player characters positioned in the portion of the map displayed on the game screen;

selecting, when the selecting coordinate positions form a closed area, the at least one player character based on the formed closed area;

determining, when the selecting coordinate positions do not form the closed area, the closed area based on a start point and a finish point of the selecting coordinate positions and selecting the at least one player character based on the determined closed area;

inputting, from the coordinate position inputter by a destination designating operation, a destination coordinate position corresponding to a desired position on the portion of the map that is displayed on the game screen after the selecting coordinate positions for selecting the at least one player character have been input;

storing the destination coordinate position corresponding to the desired position as a destination of each of the at least one player character enclosed by the selecting coordinate positions;

moving the at least one player character toward the destination from the present position of each of the at least one player character in accordance with a movement route; and stopping movements of the at least one player character on the map and partway through the movement route when a game condition is switched from a normal time state to an image fixing time state before the at least one player character is at the destination, wherein the enclosing operation for selecting any of the at least one player character is configured to be received during the image fixing state and when the movements of the at least one player character on the map are stopped for facilitating changing of the destination, the movements of the at least one player character are configured to be restarted in accordance with the movement route when the game condition is switched from the image fixing time state to the normal time state and the enclosing operation is not received during the image fixing state for facilitating reconsideration of the changing of the destination, the destination coordinate position is configured to be stored in the storage as the present position for each of the at least one player character when the at least one player character is at the destination, and the enclosing operation is independent of the destination designating operation.

18. A non-transitory computer readable recording medium comprising a program executable in a computer that comprises a display that displays a game screen and a coordinate position inputter that inputs coordinate positions corresponding to the game screen, the program being executable for implementing a game that comprises a plurality of player characters movable on a map, the non-transitory computer readable recording medium comprising:

a map display code section which is executable to display at least a portion of the map on the game screen, the plurality of player characters being positioned on the map in accordance with present positions;

an enclosing coordinate input code section which is executable to input selecting coordinate positions from the coordinate position inputter by an enclosing operation of a player for selecting at least one player character, from among the plurality of player characters positioned on the portion of the map;

a selecting code section which is executable to, when the selecting coordinate positions form a closed area, select the at least one player character based on the formed closed area, the selecting code section being further executable to, when the selecting coordinate positions do not form the closed area, determine the closed area based on a start point and a finish point of the selecting coordinate positions and select the at least one player character based on the determined closed area;

a position input code section which is executable to input a destination coordinate position corresponding to a desired position on the portion of the map from the coordinate position inputter by a destination designating operation of the player after the selecting coordinate positions for selecting the at least one player character are input;

a movement route determination code section which is executable to determine a movement route for each of the at least one player character for moving the at least one player character toward the desired position on the map corresponding to the input destination coordinate position; and a player character moving code section which is executable to move the at least one player character on the map in accordance with the movement route determined for each of the at least one player character by the movement route determination code section, wherein the enclosing operation of the player is independent of the destination designating operation of the player, the player character moving code section is configured to stop movements of the at least one player character on the map and partway through the movement route when the player switches a game condition from a normal time state to an image fixing time state before the at least one player character is at the desired position, the enclosing coordinate input code section is configured to receive the enclosing operation of the player for selecting any of the at least one player character during the image fixing state and when the movements of the at least one player character on the map are stopped for facilitating changing of the desired position, and the player character moving code section is configured to restart the movements of the at least one player character in accordance with the movement route when the player switches the game condition from the image fixing time state to the normal time state and the enclosing operation is not received during the image fixing state for facilitating reconsideration of the changing of the desired position on the map.

19. The non-transitory computer readable recording medium according to claim 18, wherein each code section is tangibly embodied in the computer.

\* \* \* \* \*